United States Patent
Yagiu

(10) Patent No.: US 7,483,997 B2
(45) Date of Patent: Jan. 27, 2009

(54) DATA DISTRIBUTION CONTROL DEVICE AND DATA DISTRIBUTION CONTROL METHOD

(75) Inventor: Riko Yagiu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 841 days.

(21) Appl. No.: 10/169,992

(22) PCT Filed: Nov. 13, 2001

(86) PCT No.: PCT/JP01/09893

§ 371 (c)(1),
(2), (4) Date: Jul. 12, 2002

(87) PCT Pub. No.: WO02/41603

PCT Pub. Date: May 23, 2002

(65) Prior Publication Data

US 2003/0105877 A1    Jun. 5, 2003

(30) Foreign Application Priority Data

Nov. 14, 2000  (JP)  ............................. 2000-347290
Nov. 6, 2001   (JP)  ............................. 2001-340932

(51) Int. Cl.
G06F 15/16   (2006.01)
G06F 15/173  (2006.01)
(52) U.S. Cl. .................................. 709/237; 709/224
(58) Field of Classification Search ................ 709/237, 709/224
See application file for complete search history.

(56) References Cited

U.S. PATENT DOCUMENTS 4,896,151 A  *  1/1990  Kuranami et al. ...... 340/825.52

(Continued)

FOREIGN PATENT DOCUMENTS

JP   11-112576 A   4/1999
JP   11-252179 A   9/1999

OTHER PUBLICATIONS

Hasegawa et al., Technical Report of IEICE, pp. 67-72 (1995) w/ translation.

(Continued)

Primary Examiner—John Follansbee
Assistant Examiner—Alan S Chou
(74) Attorney, Agent, or Firm—Birch, Stewart, Kolasch & Birch, LLP

(57) ABSTRACT

A data distribution management device (10) is provided on a transmission route between a transmission device (C1) that requires a delivery acknowledgement corresponding to data transmitted and a receiving device (C2) in which a transmission delay in a circuit (2) is smaller than a transmission delay in a circuit (3), and comprises a transfer unit that transfers the data from the transmission device (C1) to the receiving device (C2), a returning unit that prepares a delivery acknowledgement corresponding to the data transferred and send the delivery acknowledgement to the transmission device. The data distribution management device (10) also comprises a SG distribution control section (16) that decides whether the data transmitted by the transmission device (C1) is a protocol dependent on transmission delays and that orchestrates the returning unit to prepare a delivery acknowledgement and send the delivery acknowledgement when it is decided that the data is the delay dependent protocol.

46 Claims, 22 Drawing Sheets

U.S. PATENT DOCUMENTS

| | | | | |
|---|---|---|---|---|
| 5,371,731 A | * | 12/1994 | Pratt et al. | 370/216 |
| 5,862,316 A | * | 1/1999 | Hagersten et al. | 714/15 |
| 6,105,122 A | * | 8/2000 | Muller et al. | 712/1 |
| 6,332,165 B1 | * | 12/2001 | Hagersten et al. | 709/238 |
| 6,363,425 B1 | * | 3/2002 | Hook et al. | 709/226 |
| 6,452,915 B1 | * | 9/2002 | Jorgensen | 370/338 |
| 6,640,325 B1 | * | 10/2003 | Fischer | 714/748 |
| 6,681,254 B1 | * | 1/2004 | Gregg et al. | 709/232 |
| 6,928,471 B2 | * | 8/2005 | Pabari et al. | 709/223 |
| 7,010,607 B1 | * | 3/2006 | Bunton | 709/228 |
| 7,010,614 B2 | * | 3/2006 | Satran et al. | 709/237 |
| 2004/0059979 A1 | * | 3/2004 | Palm | 714/748 |
| 2004/0083299 A1 | * | 4/2004 | Dietz et al. | 709/230 |

OTHER PUBLICATIONS

Miyake et al., Multimedia communications and distributed processing, pp. 63-68 (1998) w/ translation.

* cited by examiner

FIG.4

| REFERENCE HEADER (D1) | PROTOCOL NAME (D2) | SPOOFING USE : ALLOWED OR NOT (D3) |
|---|---|---|
| IP | TCP | ○ |
| | UDP | × |
| | ICMP | × |
| TCP | BGP | × |

FIG.5

| D11 | D12 | D13 | D14 | D15 | | | D16 | D17 | D18 |
|---|---|---|---|---|---|---|---|---|---|
| TRANSMISSION POINT IP | DESTINATION IP | TRANSMISSION PORT | DESTINATION PORT | WINDOW SIZE | TRANSMISSION POINT | DESTINATION | Packet Num | tmpACK TRANS-MISSION | STATE OF RRACK |
| | | | | | TRANS-MISSION | RE-CEPTION | | | |
| 10.74.3.177 | 10.74.3.200 | FTP.DATA | 1301 | 16K | | | 398 | NOT ALLOWED | ACK WAITING |
| | | | | 16K | | | 399 | FINISHED | ACK RECEIVED |
| | | | | | 16K | | · | FINISHED | ACK WAITING |
| | | | | | 16K | | · | FINISHED | ACK WAITING |
| | | | | 16K | | | · | FINISHED | ACK WAITING |
| | | | | 16K | | | · | FINISHED | ACK WAITING |
| | | | | | 16K | | k | ALLOWED | ACK WAITING |

| DESTINATION | ROUTE CIRCUIT | ERRORS |
|---|---|---|
| R1 | L1 | MANY |
| R2 | L2 | FEW |
| R3 | L1 | MANY |

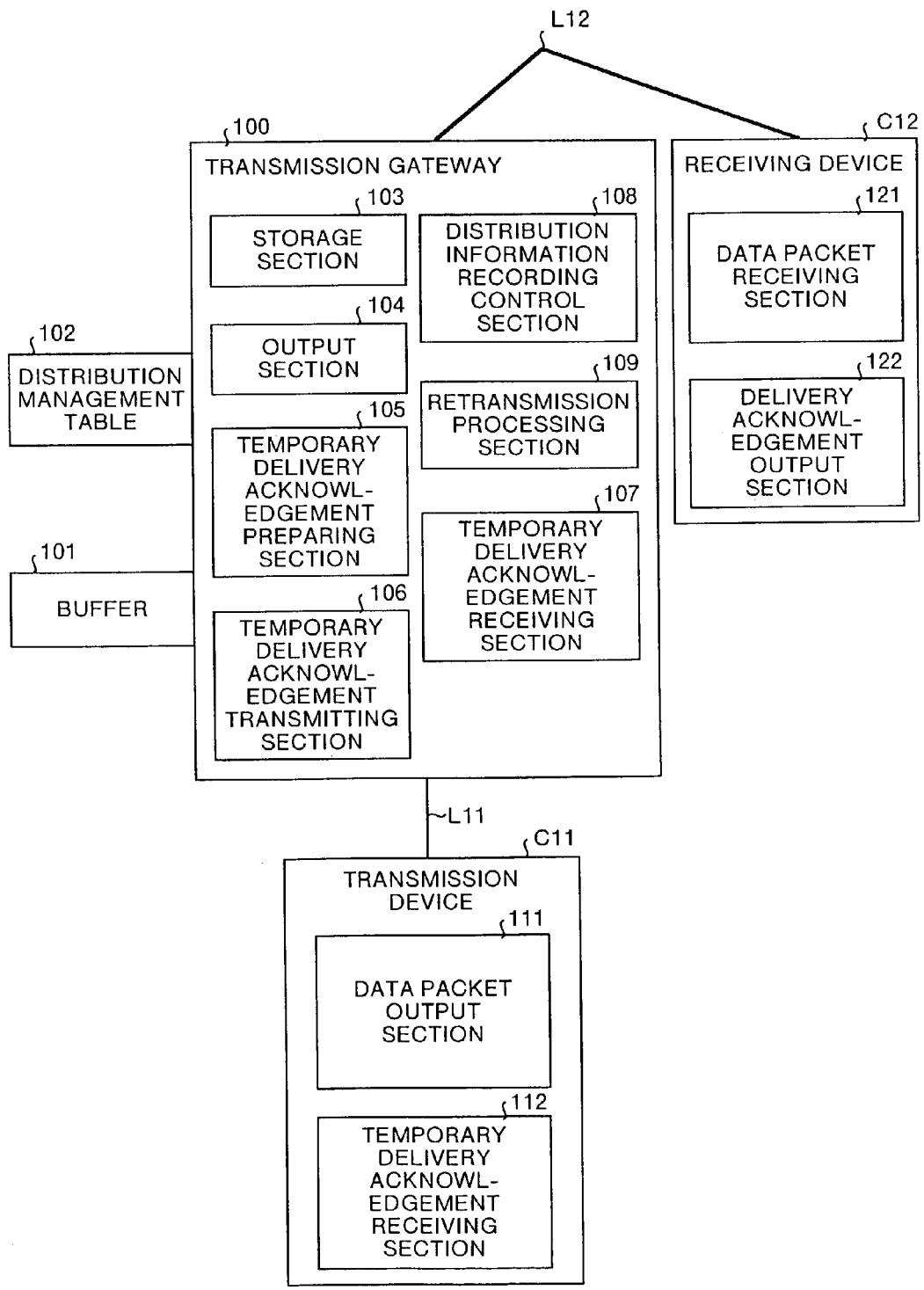

DATA DISTRIBUTION CONTROL DEVICE AND DATA DISTRIBUTION CONTROL METHOD

TECHNICAL FIELD

The present invention relates to a data distribution management device which is provided on a transmission route between a transmission device that requires a delivery acknowledgement to data transmitted and a receiving device that constitutes the other party in bilateral communication with the transmission device, and in which a delay in transmission with the transmission device is small compared with the delay in transmission with the receiving device, and for which it is possible to carry out both data transfer processing where at least the data from the transmission device is transferred to the receiving device and data return processing where delivery acknowledgement to the data transferred is prepared and sent to the transmission device. More particularly, this invention relates to a data distribution management device and a data distribution management method capable of suppressing deterioration in speed performance that depends upon the timing of reception of delivery acknowledgement during data distribution.

BACKGROUND ART

FIG. 22 is a block diagram showing the configuration of the data distribution management system in which a conventional data distribution management device is used (refer to Study Report 98-DPS-89-12 of the Information Processing Society of Japan). As in FIG. 22, this data distribution management system is provided with a transmission device C11, a receiving device C12, and a transmission gateway 100 which is connected to both the transmission device C11 and the receiving device C12 through respective circuit L11 and circuit L12 through which communications are performed based on TCP. Compared to the circuit L11, the circuit L12 is a circuit that, like satellite circuits, for example, is large in transmission delay.

In FIG. 22, the transmission device C11 is provided with a data packet output section 111 that outputs data packets and a temporary delivery acknowledgement receiving section 112 that receives a temporary delivery acknowledgement that the transmission gateway 100 prepares. The transmission gateway 100 is provided with not only a buffer 101 and a distribution management table 102 but also a storage section 103 that receives the data packets transmitted from the transmission device C11 and stores these data packets in the buffer 101, an output section 104 that outputs those data packets stored in the buffer 101 to the receiving device C11 through the circuit L12, a temporary delivery acknowledgement preparation section 105 which prepares a temporary delivery acknowledgement corresponding to the data packets transmitted to the receiving device C11, a temporary delivery acknowledgement transmission section 106 that transmits this prepared delivery acknowledgement to the transmission device C11, a delivery acknowledgement receiving section 107 that receives a delivery acknowledgement sent from the receiving device C11, a distribution information recording control section 108 that obtains communications information from received SYN packets and records them in the distribution management table 102 as distribution information, and a retransmission processing section 109 that performs retransmission of the data packets. Further, the receiving device C11 has a data packet receiving section 121 provided to receive data packets from the transmission gateway 100 and has also a delivery acknowledgement output section 122 provided to output a delivery acknowledgement to the transmission gateway 100.

When data packets are sent out from the transmission device C11, the transmission gateway 100 temporarily stores the received data packets in the buffer 101 and simultaneously enters the data packet in the distribution management table 102. The transmission gateway 100 transfers the data packet received from the transmission device C11 to the receiving device C12 through circuit L12 and prepares a temporary delivery acknowledgement data packet corresponding to the data packet and transmits this temporary delivery acknowledgement to the transmission device C11.

On receipt of the data packet from the transmission gateway 100, the receiving device C12 prepares a delivery acknowledgement corresponding to the received data packet and transmits this delivery acknowledgement to the transmission gateway 100. This delivery acknowledgement includes data that concerns corresponding data packets and another set of data concerning confirmation as to whether those data packets have been delivered. When the transmission gateway 100 has received the delivery acknowledgement from the receiving device C12, the transmission gateway 100 clears the data packets which are retained in the transmission gateway 100 and which correspond to this delivery acknowledgement.

Should it happen in the process of transmitting a data packet from the transmission gateway 100 to the receiving device C12, that the transfer of this data packet fails and that the receiving device C12 consequentially fails to receive this data packet, then the transmission gateway 100 receives an identical delivery acknowledgement three times on end from the receiving device C12 and retransfers the data packet.

Thus, under the conventional data distribution management system, the transmission gateway 100 sends a temporary delivery acknowledgement (tmpACK) to the transmission device C11 at the same time as the transmission gateway 100 transmits a data packet to the receiving device C12, and thereby reduction in the TCP window size under the circuit L12's transmission cost burdens has been prevented, a falloff in the system's throughput eliminated, and deterioration in the speed performance suppressed.

Moreover, when it receives a data packet from the transmission unit, the transmission gateway 100 prepares a temporary delivery acknowledgement and retains the data packet until a delivery acknowledgement (ACK) is received from the transmission unit, and only when three identical delivery acknowledgements (duplicate ACK) are received does the transmission gateway decide that the data packet transmission is a failure and proceed to retransmit the retained data packet.

Under the conventional data distribution management system, however, the existence of the data segments whose protocols are not influenced by transmission delays is not considered, nor is the existence of the data segments of which the protocols deteriorate in transmission efficiency once a temporary delivery acknowledgement is used. This plus the conventional practice of sending a temporary delivery acknowledgement to the transmission device C11 with respect to all data segments, has increased the processing load on both the transmission gateway 100 and the transmission device C11, and conversely, often deteriorates their speed performance to a problematic extent.

Furthermore, in conventional practices, temporary delivery acknowledgement is sent to the transmission device C11 with respect to all data segments, and therefore even when erroneous data segments are received from the transmission device C11 as are those data segments which are interpreted as data segments of other than BGP or windows type, a temporary delivery acknowledgement is invariably sent to the transmission device C11 to often result in contradictions arising in communication, in which case the processing load on the transmission gateway 100 and on the transmission device C11 increases so much so that the problem of deteriorated speed performance crops up.

Additionally, the delivery acknowledgments sent from the receiving device C12 are wholly abrogated at the transmission gateway 100 and are in no case transferred to the transmission device C11. Therefore, when data is transmitted in so-called piggyback fashion in which delivery acknowledgements transmitted from the receiving device C12 are included in the data segments transmitted from the receiving device C12 to the transmission device C11, there emerges a problem such that the data segments from the receiving device C12 to the transmission device C11 do not reach the transmission device C11.

Accordingly, it is an object of this invention to provide a data distribution management device and a data distribution management method capable of eliminating the contradictions involving communications between a transmission unit and a receiving unit, reducing the load involving the preparation and transmission of temporary delivery acknowledgement, and performing further high-speed and correct data distributions.

DISCLOSURE OF THE INVENTION

A data distribution management device according to this invention is provided on a transmission route between first and second terminal devices, the first terminal device performing communication with the second terminal device. The data distribution management device comprises: a transfer unit which orchestrates the first terminal device to transfer data to the second terminal device; a returning unit which prepares a delivery acknowledgement corresponding to the data transferred from the first terminal device and sends the delivery acknowledgement to the first terminal device; a decision unit which decides whether the data transferred from the first terminal device to the second terminal device is a protocol that depends on transmission delays; and a management control unit which, when the decision unit decides that the data is the protocol that depends on transmission delays, orchestrates the returning unit to prepare the delivery acknowledgement and send the delivery acknowledgement to the first terminal device.

According to this invention, the decision unit decides whether the data transferred from the first terminal device is a protocol that depends on transmission delays. The management control unit orchestrates the returning unit to send the delivery acknowledgement only when the decision unit decides that the data is the protocol that depends on transmission delays, and the return processing not to send the delivery acknowledgement when the protocol is unaffected by transmission delays or when the protocol gets deteriorated in efficiency with temporary delivery acknowledgement.

A data distribution management device according to the next invention is provided on a transmission route between first and second terminal devices, the first terminal device performing communication with the second terminal device. The data distribution management device comprises: a transfer unit which orchestrates the first terminal device to transfer data to the second terminal device; a returning unit which prepares a delivery acknowledgement corresponding to the data transferred from the first terminal device and sends the delivery acknowledgement to the first terminal device; a decision unit that decides whether the destination of the data transferred from the first terminal device passes through an error-prone circuit; and a management control unit that orchestrates the returning unit to send the delivery acknowledgement to the first terminal device when the decision unit decides that the destination passes through the error-prone circuit.

According to this invention, the decision unit decides whether the destination of the data transferred from the first terminal device passes through an error-prone circuit. The management control unit orchestrates the returning unit to send a delivery acknowledgement when the decision unit decides that the destination passes through an error-prone circuit, and it is thereby prevent throughput from deteriorating due to errors.

In the data distribution management device according to the next invention based on the above invention, the decision unit further decides whether the data that the first terminal device transmits is a protocol dependent on errors and having the possibility of reducing the throughput, and the management control unit orchestrates the returning unit to send the delivery acknowledgement to the first terminal device, if and when the decision unit decides that the data distributed passes through an error-prone circuit and that the data is a protocol dependent on errors and having the possibility to reduce the throughput.

According to this invention, the decision unit further decides whether the data that the first terminal device transmits is a protocol dependent on errors and having the possibility of reducing the throughput, and the management control unit orchestrates the returning unit to send the delivery acknowledgement and determines the return processing of the delivery acknowledgement on a protocol by protocol basis if and when the decision unit decides that the data transmitted passes through an error-prone circuit and that the data is a protocol dependent on errors and having the possibility to reduce the throughput.

In the data distribution management device according to the next invention based on the above invention, the decision unit at least decides whether the data transmitted by the first terminal device is a protocol dependent on errors or whether the data passes through an error-prone circuit, and the management control unit orchestrates the returning unit to send the delivery acknowledgement to the first terminal device if and when the decision unit decides that the data distributed is a protocol dependent on the transmission delays or that the data passes through an error-prone circuit.

According to this invention, the decision unit decides whether the data delivered is a protocol dependent at least on the transmission delays or whether the data passes through an error-prone circuit. The management control unit orchestrates the returning unit to send a delivery acknowledgement if and when the decision unit decides that the data delivered is a protocol dependent on the transmission delays or that the data passes through an error-prone circuit, thus the return processing being geared to avoid the influence solely of transmission delays, the influence solely of errors, or the influence of both the transmission delays and the errors.

The data distribution management device according to the next invention further comprises a communication start decision unit that decides whether the data transmitted by the first terminal device is the data relevant to a start of communication. The management control unit orchestrates the returning unit not to send the delivery acknowledgement, if and when the communication start decision unit decides that the data transmitted is the data relevant to a start of communication.

According to this invention, the communication start decision unit decides whether the data transmitted by the first terminal device is the data relevant to a start of communication. The management control device orchestrates the returning unit not to send a delivery acknowledgement if and when the communication start decision unit decides that the first terminal-transmitted data is the data relevant to a start of communication.

In the data distribution management device according to the next invention based on the above invention further comprises a communication ending decision unit that decides whether the data transmitted by the first terminal device is the data relevant to an ending of communication. The management control unit orchestrates the returning unit not to send the delivery acknowledgement, if and when the communication ending decision unit decides that the data transmitted is the data relevant to an ending of the communication.

According to this invention, the communication ending decision unit decides whether the data transmitted by the first terminal device is data relevant to an ending of communication. The management control device orchestrates the returning unit not to send a delivery acknowledgement if and when the communication ending decision unit decides that the first terminal-transmitted data is data relevant to the ending of communication.

The data distribution management device according to the next invention based on the above invention further comprises a reception decision unit that decides whether the data transmitted by the first terminal device is the data that is validly acceptable to the second terminal device. The management control unit orchestrates the returning unit not to send the delivery acknowledgement to the first terminal device if and when the reception decision unit decides that the data transmitted by the first terminal device is not validly acceptable to the second terminal device.

According to this invention, the reception decision unit decides whether the data transmitted by the first terminal device is the data validly acceptable to the second terminal device. The management control device orchestrates the returning unit not to send the delivery acknowledgement if and when the reception decision unit decides that the first terminal-transmitted data is not validly acceptable to the second terminal device.

The data distribution management device according to the next invention based on the above invention further comprises an information obtaining unit that obtains information pertaining to communication between the first and the second terminal devices from header information regarding the data received from the first and the second terminal devices; and an information retaining unit that retains the communication-related information obtained by the information obtaining unit. When making a decision, the decision unit, the communication start decision unit, the communication ending decision unit or the reception decision unit make the decision based on the communications-related information.

According to this invention, the information obtaining unit obtains information related to the communication between the first and the second terminal devices from the header-information pertaining to the arbitrary data received from the first and the second terminal devices, the information retaining unit retains the communication-related information obtained by the information obtaining unit, and the decision unit, the communication start decision unit and the communication ending decision unit or the reception decision unit each make decisions based on the above-mentioned communications-related information to thereby orchestrate the returning unit to send the delivery acknowledgement, the return processing being not orchestrated, however, in the case involving a protocol where the use of temporary delivery acknowledgement renders the protocol less efficient.

The data distribution management device according to the next invention based on the above invention further comprises at least one data buffer that retains the data received from the first and the second terminal devices at the establishment of communication. Subsequent to the establishment of communication, the management control unit orchestrates the returning unit to send the delivery acknowledgement to the first terminal device based on the contents of data stored in segments of the data buffer and in the data buffer.

According to this invention, the at least one data buffer retains the data received from the first and the second terminal devices at the establishment of communications, and the management control unit orchestrates the returning unit to send the delivery acknowledgement to the first terminal device after the establishment of the communication, based on the contents of data stored in segments of the data buffer and in the data buffer.

In the data distribution management device according to the next invention based on the above invention, the data buffer is laid out in a plurality at each of the connections between the first and the second terminal devices.

According to this invention, the data buffer is laid out in a plurality at each of the connections between the first and the second terminal devices and communications are managed in units of connection.

The data distribution management device according to the next invention based on the above invention further comprises a management table that manages the data buffer for every connection.

According to this invention, the management table is devised so as to manage the at least one data buffer with respect to every connection.

In the data distribution management device according to the next invention based on the above invention, the data buffer is provided in a plurality for every protocol.

According to this invention, the data buffer is provided in a plurality for every protocol and communications are managed according to classes of protocols.

The data distribution management device according to the next invention based on the above invention further comprises a management table that manages the data buffer for every protocol.

According to this invention, the data buffer is managed by the management table in accordance with the classes of protocols.

The data distribution management device according to the next invention based on the above invention further comprises a result retention unit that receives and retains the delivery acknowledgement sent from the second terminal device.

According to this invention, the result retention unit is devised so as to receive the delivery acknowledgement transmitted from the second terminal device and retain the result of the delivery acknowledgement.

The data distribution management device according to the next invention based on the above invention further comprises a data inclusion decision unit that decides whether the delivery acknowledgement received from the second terminal device includes in it the data corresponding to the first terminal device. The management control unit abrogates the delivery acknowledgement retained in the result retention unit if and when the data inclusion decision unit decides that the data corresponding to the first terminal device is not included in the delivery acknowledgement.

According to this invention, the data inclusion decision unit decides whether the delivery acknowledgement received from the second terminal device includes in it the data corresponding to the first terminal device, whilst the management control unit abrogates the delivery acknowledgement retained in the result retention unit if and when the data inclusion decision unit decides that the data corresponding to the first terminal device is not included in the delivery acknowledgement.

The data distribution management device according to the next invention based on the above invention further comprises a management unit that manages the information pertaining to the communications between the first and the second terminal devices; a buffer that retains the data transferred from the first terminal device to the second terminal device; a timer that measures the time it takes for the delivery acknowledgement to reach from the second terminal device; and a retransmission control unit which in the event of a data segment or segments of the delivery acknowledgement failing to be received from the second terminal, fetches these data segments from the buffer and retransmits them to the second terminal device on the information pertaining to the communication managed by the management unit and the time for the delivery acknowledgement measured by the timer.

According to this invention, the management unit manages the information pertaining to the communications between the first and the second terminal devices, the buffer retains the data transferred from the first terminal device to the second terminal device, the timer measures the time it takes for the delivery acknowledgement to reach from the second terminal device, and the retransmission control unit which in the event of a data segment or segments of the delivery acknowledgement failing to be received from the second terminal, fetches these data segments from the buffer and retransmits them to the second terminal device.

A data distribution management device according to the next invention is provided on a transmission route between first and second terminal devices, the first terminal device performing communication with the second terminal device. The data distribution management device comprises: a transfer unit which orchestrates the first terminal device to transfer data to the second terminal device; a returning unit which prepares a delivery acknowledgement corresponding to the data transferred from the first terminal device and sends the delivery acknowledgement to the first terminal device; and a decision unit that decides whether the delivery acknowledgement is to be prepared and sent by the returning unit, relative to the individual data segments, based on contents of the data segments; and a return processing execution unit that orchestrates the returning unit to execute the return processing decided by the decision unit.

According to this invention, the decision unit decides whether the returning process of preparing and sending delivery acknowledgement be performed with respect to these data segments based on the contents of the data segments received, whilst the return processing execution unit orchestrates the returning unit to execute the return processing decided by the decision unit.

The data distribution management device according to the next invention based on the above invention further comprises a decision information retaining unit that retains the decision information on whether the returning unit should be orchestrated to prepare and send the delivery acknowledgement decided by the decision unit.

According to this invention, the decision information retaining unit retains the decision information on whether the returning unit should be orchestrated to prepare and send the delivery acknowledgement decided by the decision unit.

The data distribution management device according to the next invention based on the above invention further comprises a returned information retaining unit that retains information on the fact of the delivery acknowledgement having been sent in the event of the return processing execution unit having transmitted the delivery acknowledgement to the first terminal device.

According to this invention, when the delivery acknowledgement has been transmitted to the first terminal device, the returned information retaining unit retains the information indicating that the delivery acknowledgement having been sent.

A data distribution management device according to the next invention is provided on a transmission route between first and second terminal devices, the first terminal device performing communication with the second terminal device. The data distribution management device comprises: a transfer unit which orchestrates the first terminal device to transfer data to the second terminal device; and a returning unit which prepares a delivery acknowledgement corresponding to the data transferred from the first terminal device and sends the delivery acknowledgement to the first terminal device. The returning unit uses a control data of data transmitted by the first terminal device, the second terminal device, or both the first and the second terminal devices when preparing the delivery acknowledgement.

According to this invention, when the return processing is performed, the control data of the data transmitted by the first terminal device, the second terminal device, or both the first and the second terminal devices is used when preparing the delivery acknowledgement.

The data distribution management device according to the next invention based on the above invention further comprises a storage unit that stores the control data of the data transmitted by the first terminal device, the second terminal device, or both the first and the second terminal devices. The returning unit uses the control data stored in the storage unit when preparing the delivery acknowledgement.

According to this invention, the storage unit stores the control data of the data transmitted by the first terminal device, the second terminal device, or both the first and the second terminal devices, and the returning unit uses the stored control data when preparing the delivery acknowledgement.

The data distribution management device according to the next invention based on the above invention further comprises an acquisition unit that acquires the data to be used when preparing the delivery acknowledgement from a control data of data transmitted by the first terminal device, the second terminal device, or both the first and the second terminal devices. The returning unit uses the control data acquired by the acquisition unit when preparing the delivery acknowledgement.

According to this invention, the acquisition unit acquires data to be used when preparing the delivery acknowledgement from the control data of data transmitted by the first terminal device, the second terminal device, or both the first and the second terminal devices, and returning unit uses the acquired data when preparing the delivery acknowledgement.

The data distribution management device according to the next invention based on the above invention further comprises a retention unit that retains the control data acquired by the acquisition unit. The returning unit uses the control data retained by the retention unit when preparing the delivery acknowledgement.

According to this invention, the retention unit retains the control data acquired by the acquisition unit and returning unit uses the control data retained by the retention unit when preparing the delivery acknowledgement.

In the data distribution management device according to the next invention based on the above invention, a delivery acknowledgement once used is recycled when the subsequent delivery acknowledgement is to be prepared.

According to this invention, the delivery acknowledgement once used is recycled when the subsequent delivery acknowledgement is to be prepared.

The data distribution management device according to the next invention based on the above invention further comprises an information combination unit which, when the delivery acknowledgement is prepared, includes in the data sent from the second terminal device to the first terminal device the delivery acknowledgement sent to the first terminal device from the second terminal device. The data so combined by the information combination unit is transmitted to the first terminal device.

According to this invention, when the delivery acknowledgement is prepared, the information combination unit includes in the data sent from the second terminal device to the first terminal device the delivery acknowledgement sent to the first terminal device from the second terminal device, and transmits the data so combined by the information combination unit to the first terminal device, thereby rendering it possible for the data transferred from the first terminal device to be transmitted positively to the second terminal device in a piggyback fashion, for instance.

The data distribution management device according to the next invention based on the above invention further comprises a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists. The management control unit orchestrates the returning unit to prepare a delivery acknowledgement and send the delivery acknowledgement to the first terminal device if and when the segments count decision unit decides that the yet-to-be-received data segments exist.

According to this invention, the segments count decision unit possesses a prescribed number of yet-to-be-received, if not final, data segments which must be counted to prepare yet-to-be-received delivery acknowledgements at the second terminal device, and further decides whether there exist the prescribed number of yet-to-be-received data segments, whilst the management control unit orchestrates the returning unit to prepare a delivery acknowledgement and send the delivery acknowledgement to the first terminal device if and when the segments count decision unit decides that the yet-to-be-received data segments exist.

The data distribution management device according to the next invention based on the above invention further comprises an object segment decision unit that possesses time variables concerning the timing of transmission of a delivery acknowledgement and that decides segments as objects of the delivery acknowledgement which is to be prepared with every time lapse that the time variables indicate. The management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

According to this invention, the object segment decision unit possesses time variables concerning the timing of transmission of a delivery acknowledgement and decides segments as objects of the delivery acknowledgement which is to be prepared with every lapse of the time that the time variables indicate. The management control unit orchestrates the returning unit to prepare the delivery acknowledgement corresponding to the state of reception of the segments decided by the object segment decision unit as the objects for the preparation of delivery acknowledgement, and to send the delivery acknowledgement to the first terminal device.

The data distribution management device according to the next invention based on the above invention further comprises an object segment decision unit that possesses reception segment number variables concerning the timing of transmission of a delivery acknowledgement and that decides segments as objects of the delivery acknowledgement which is to be prepared at every reception of the number of segments that the reception segment number variables indicate. The management control unit orchestrates the returning unit to prepare the delivery acknowledgement corresponding to the state of reception of the segments decided by the object segment decision unit as the objects for the preparation of delivery acknowledgement, and send the delivery acknowledgement to the first terminal device.

According to this invention, the object segment decision unit possesses reception segment number variables concerning the timing of transmission of a delivery acknowledgement and decides segments as objects of the delivery acknowledgement which is to be prepared at every reception of the segments count that the reception segment number variables indicate. The management control unit orchestrates the returning unit to prepare the delivery acknowledgement corresponding to the state of reception of the segments decided by the object segment decision unit as the objects for the preparation of delivery acknowledgement and to send the delivery acknowledgement to the first terminal device.

In the data distribution management device according to the next invention based on the above invention, the management control unit performs data transfer processing relative to the data received from the transmission route the amount of whose transmission delays is larger than has been preset and performs, relative to the data received from the transmission route the amount of whose transmission delays is smaller than has been preset, both the transfer processing of the data and the return processing in which a delivery acknowledgement corresponding to the transferred data is prepared and sent by the returning unit.

According to this invention, the management control unit performs data transfer processing relative to the data received from the transmission route the amount of whose transmission delays is larger than has been preset and performs—relative to the data received from the transmission route the amount of whose transmission delays is smaller than has been preset—both the transfer processing of the data and the return processing in which a delivery acknowledgement corresponding to the transferred data is prepared and sent by the returning unit.

In the data distribution management device according to the next invention based on the above invention, a delay in transmission corresponding to the first terminal device is smaller than a delay in transmission corresponding to the second terminal device.

According to this invention, when the delay in transmission with the first terminal device is smaller than the delay in transmission with the second terminal device, it is devised such that the contradiction involving communications between transmission and reception is resolved and the data distribution from the first terminal device to the second is made at a high speed and accurately.

A data distribution management method according to the next invention is employed on a transmission route between first and second terminal devices, the first terminal device performing communication with the second terminal device. The data distribution management method comprises: a transmission step of orchestrating the first terminal device to transmit data to the second terminal device; a returning step of preparing a delivery acknowledgement corresponding to the data transferred from the first terminal device and sending the delivery acknowledgement to the first terminal device; a decision step of deciding whether the data transferred from the first terminal device to the second terminal device is a protocol that depends on transmission delays; and a management control step of, when it is decided at the decision step that the data is the protocol that depends on transmission delays, providing a control to execute the returning step.

According to this invention, at the decision step, it is decided whether the data transmitted by the first terminal device is a protocol that depends on a delay in transmission, and at the management control step, when it is decided at the decision step that the data transmitted by the first terminal device is a protocol dependent on the transmission delay, the returning unit is orchestrated to prepare and send the delivery acknowledgement.

A data distribution management method according to the next invention is employed on a transmission route between first and second terminal devices, the first terminal device performing communication with the second terminal device. The data distribution management method comprises: a transfer step of orchestrating the first terminal device to transfer data to the second terminal device; a returning step of preparing a delivery acknowledgement corresponding to the data transferred from the first terminal device and sending the delivery acknowledgement to the first terminal device; a decision step of deciding whether the destination of the data transferred from the first terminal device passes through an error-prone circuit; and a management control step of, when it is decided at the decision step that the destination passes through the error-prone circuit, providing a control to execute the returning step.

According to this invention, at the decision step, it is decided whether the destination of the data transferred from the first terminal device passes through an error-prone circuit, and at the management control step, when it is decided at the decision step that the destination passes through the error-prone circuit, the returning unit is orchestrated to prepare the delivery acknowledgement and send the delivery acknowledgement to the first terminal device, and thereby preventing the throughput from falling off due to errors.

In the data distribution management method according to the next invention based on the above invention, it is further decided at the decision step whether the data transmitted by the first terminal device is a protocol which depending on an error has a possibility of reducing the throughput, and at the management control step, if and when it is decided at the decision step that the data passes through an error-prone circuit and that the data is a protocol which depending on an error has a possibility of reducing the throughput, a control is provided to execute the returning step.

According to this invention, at the decision step, it is further decided whether the data transmitted by the first terminal device is a protocol which depending on an error has a possibility of reducing the throughput, and at the management control step, when it is decided at the decision unit that the data distributed passes through an error-prone circuit and that the data is a protocol which depending on an error has the possibility of reducing the throughput, the returning unit is orchestrated to prepare the delivery acknowledgement and send the delivery acknowledgement to the first terminal device, thus the decision on the return processing being made on a protocol by protocol basis.

In the data distribution management method according to the next invention based on the above invention, it is further decided at the decision step at least whether the data transmitted by the first terminal device is a protocol that depends on a transmission delay or whether the data passes through an error-prone circuit, and at the management control step, if and when it is decided at the decision step that the data is a protocol that depends on the transmission delay or that the data passes through an error-prone circuit, a control is provided to execute the returning step.

According to this invention, at the decision step, it is decided whether the data transmitted by the first terminal device is a protocol dependent at least on the transmission delay or whether the data passes through an error-prone circuit, and at the management control step, when it is decided at the decision step that the data distributed is a protocol dependent on the transmission delay or that the data passes through an error-prone circuit, the returning unit is orchestrated to prepare the delivery acknowledgement and send the delivery acknowledgement to the first terminal device to avoid the influence of the transmission delay alone, the influence of errors alone, or the influence of both the transmission delay and the errors.

The data distribution management method according to the next invention based on the above invention further comprises a communication start decision step of deciding whether the data transmitted by the first terminal device is the data relevant to a start of the communication. At the management control step, if and when it is decided at the communication start decision step that the data is the data relevant to the start of the communication, a control is provided not to execute the returning step.

According to this invention, at the communication start decision step, it is decided whether the data transmitted by the first terminal device is the data relevant to a start of the communication. At the management control step, if and when it is decided at the communication start decision step that the data so transmitted is the data relevant to the start of the communication, a control is provided not to execute the returning step.

The data distribution management method according to the next invention based on the above invention further comprises a communication ending decision step of deciding whether the data transmitted by the first terminal device is the data relevant to an ending of communication. At the management control step, if and when it is decided at the communication ending decision step that the data transmitted is the data relevant to an ending of the communication, a control is provided not to execute the returning step.

According to this invention, at the communication ending decision step, it is decided whether the data transmitted by the first terminal device is the data relevant to an ending of the communication. At the management control step, if and when the it is decided at the communication ending decision step that the data so transmitted is the data relevant to the ending of the communication, a control is provided not to execute the returning step.

The data distribution management method according to the next invention based on the above invention further comprises a reception decision step of deciding whether the data transmitted by the first terminal device is the data that is validly acceptable to the second terminal device. At the management control step, if and when it is decided at the reception decision step that the data the first terminal device has transmitted is not validly acceptable to the second terminal device, a control is provided not to execute the returning step.

According to this invention, at the reception decision step, it is decided whether the data transmitted by the first terminal device is the data that is validly acceptable to the second terminal device. At the management control step, when it is decided at the reception decision step that the data transmitted by the first terminal device is the data that is not validly acceptable to the second terminal device, a control is provided not to execute the returning step.

BRIEF DESCRIPTION OF THE DRAWINGS

FIG. 4 shows an example of the contents of the protocol management table given in FIG. 1;

FIG. 5 is an example of the contents of the distribution management table shown in FIG. 1;

FIG. 20 shows the contents of a route circuit decision table;

FIG. 22 is a block diagram showing the configuration of the data distribution management system including conventional data distribution management devices.

BEST MODE FOR CARRYING OUT THE INVENTION

Embodiments of the data distribution management device and the data distribution management method according to this invention will be explained in detail below with reference to the accompanying drawings.

First Embodiment

Figure 1:
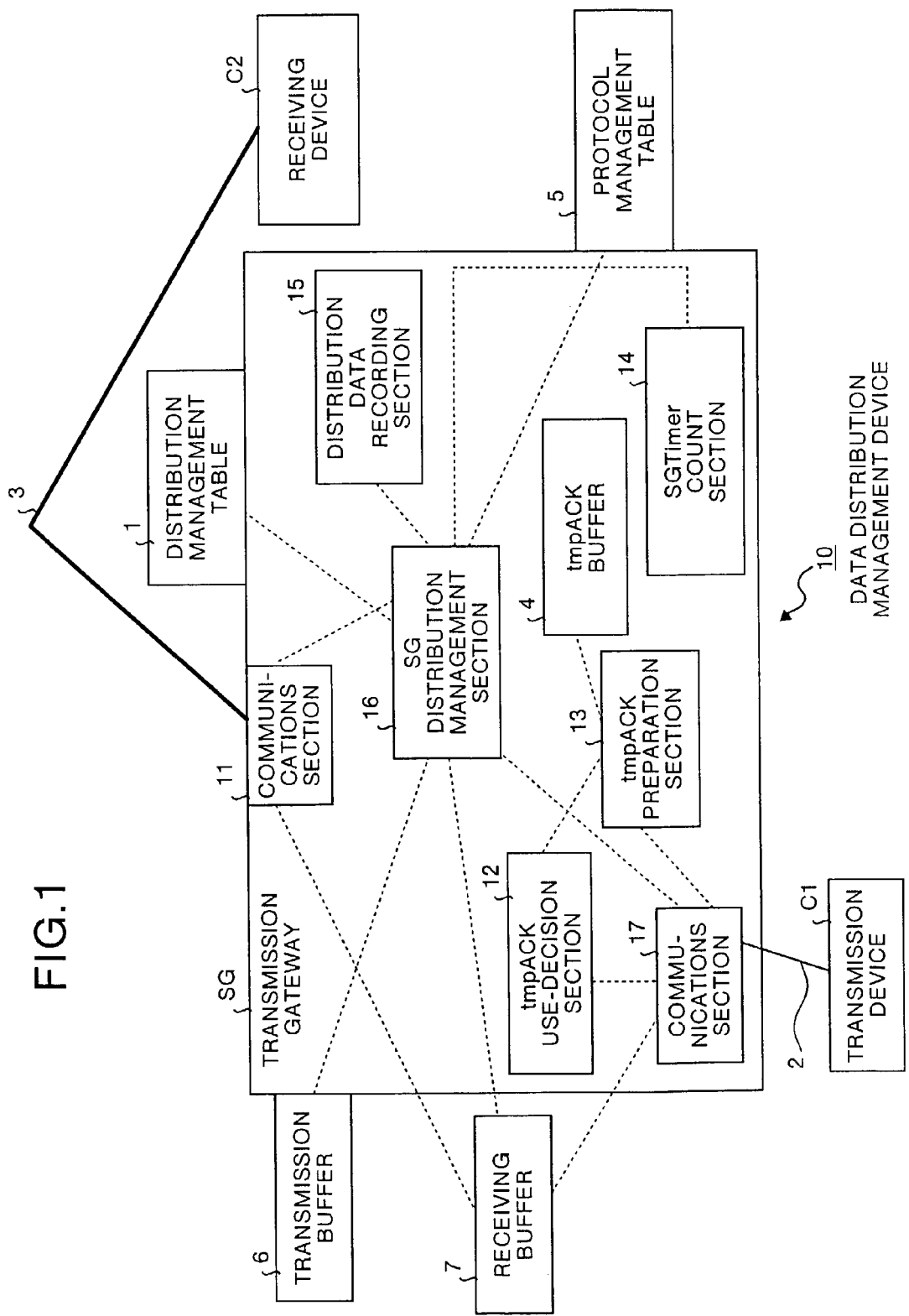
FIG. 1 is a block diagram showing the configuration of the data distribution management system including a data distribution management device according to a first embodiment of this invention.

FIG. 1 is a block diagram showing the configuration of the data distribution management system including the data distribution management device according to the first embodiment of this invention. In FIG. 1, the data distribution management system is configured so that a transmission device C1 is connected to a data distribution management device 10 through a circuit 2, whereas the data distribution management device 10 is connected to a receiving device C2 through a circuit 3. The circuit 3, like satellite circuits, is a circuit having a large transmission delay, and the circuit 2 is smaller in transmission delay compared to the circuit 3.

The data distribution management device 10 is provided with a transmission gateway SG, a distribution management table 1, a protocol management table 5, a transmission buffer 6, and a receiving buffer 7. The transmission gateway SG is provided with a communications section 17 that performs the input/output processing of data packets from/to a transmission device C1, a communications section 11 that performs the input/output processing of data packets from/to a receiving device C2, a tmpACK buffer 4 that stores received data packets to prepare temporary delivery acknowledgement (tmpACK), a tmpACK use-decision section 12 that decides whether the tmpACK should be returned to the receiving device C2 in response to the data packets transmitted, and a tmpACK preparation section 13 that prepares tmpACK based on the data packets received from the transmission device C1. The transmission gateway SG is also provided with a SGTimer count section 14 that counts up a timeout (SG-Timer) of a delivery acknowledgement with respect to each data packet and that generates a timeout event to wait for a delivery acknowledgement, a distribution data recording section 15 that writes both information on whether tmpACK has been transmitted to the transmission device C1 and information on a delivery acknowledgement from the receiving device C2 in the distribution management table 1, and a SG distribution management section 16 that manages distribution of data packets according to SGTimer values and the contents of the distribution management table 1.

In FIG. 1, the transmission buffer 6, receiving buffer 7 and the tmpACK buffer 4 are each shown as a separate buffer, but are not limited by this, and therefore a part or whole of the buffers may be installed as an identical buffer. Moreover, irrespective of whether the installing is of separate buffers or of the same buffer, the buffer(s) has a non-illustrated management table capable of combined use with information including control information in accordance with the purpose of the management. Therefore, the installation thereof so as to identify each storage position of packet data makes it possible to achieve efficiency of both data management and retrieval.

With reference to FIGS. 2 to 8, the data distribution management processing of the data distribution management device 10 will be explained. To begin with, on receipt of data packets, the communication sections 17 and 11 of the transmission gateway SG temporarily store the received data packets in receiving buffer 7, and the SG distribution management section 16 performs distribution processing shown in FIG. 2.

Figure 2:
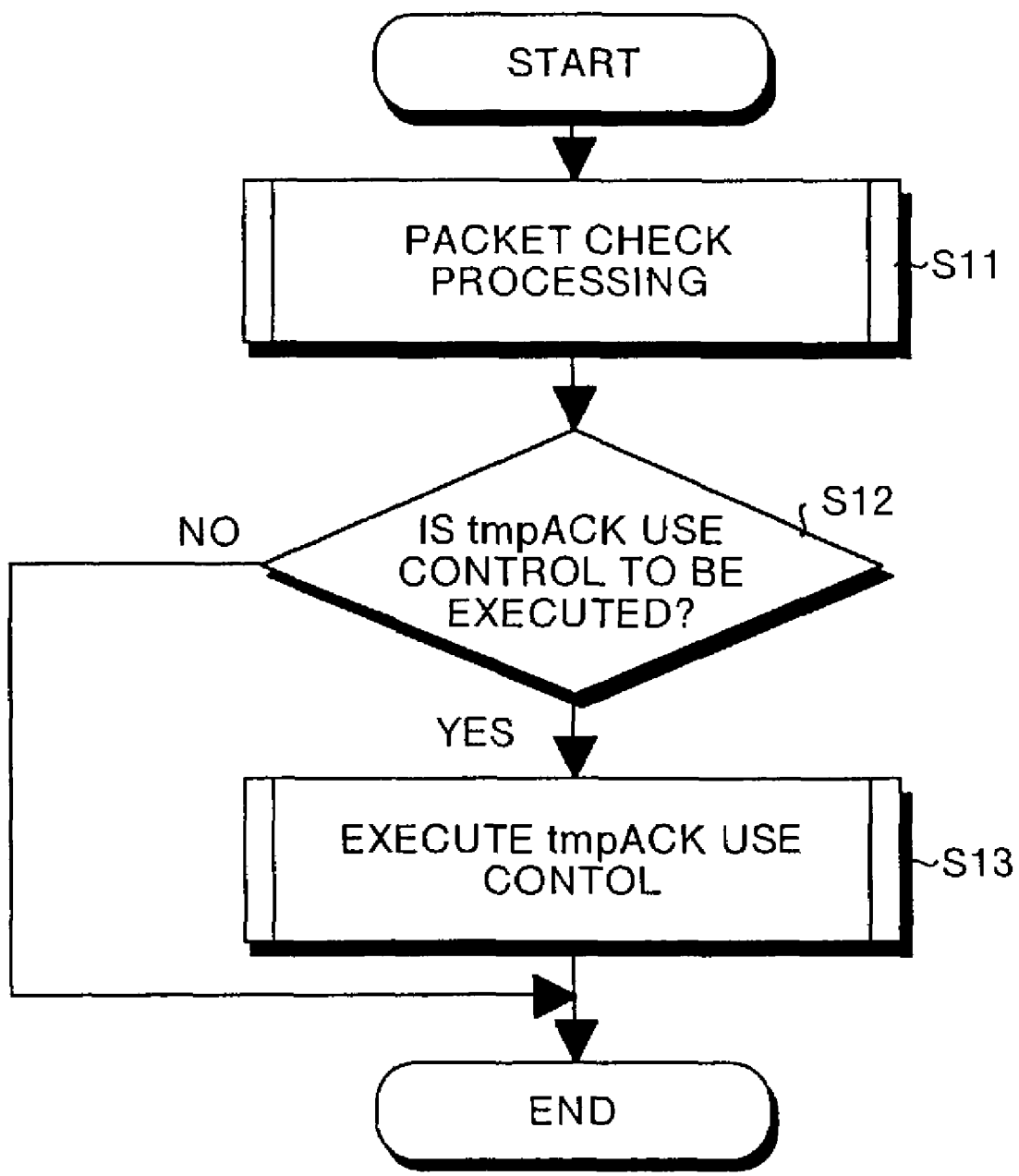
FIG. 2 is a flowchart showing the data distribution management processing procedure of the data distribution management device shown in FIG. 1.

In FIG. 2, the tmpACK use-decision section 12 checks the data packets received, decides the ON-OFF of a tmpACK usable flag for the received data packets that the transmission gateway SG possesses in accordance with the results of the check, and registers the information of received data packets including the ON-OFF of the tmpACK usable flag as necessary in the distribution management table 1 (step S11).

Subsequently, the tmpACK use-decision section 12 determines based on the tmpACK control flag whether a use of tmpACK is controlled (step S12). If it is determined that the use of tmpACK is not controlled (step S12, NO), the tmpACK use-decision section 12 finishes the processing without any change. If it is determined that the use of tmpACK is controlled (step S12, YES), the tmpACK use-decision section 12 performs the tmpACK-use control processing (step S13) and finishes the processing.

Figure 3:
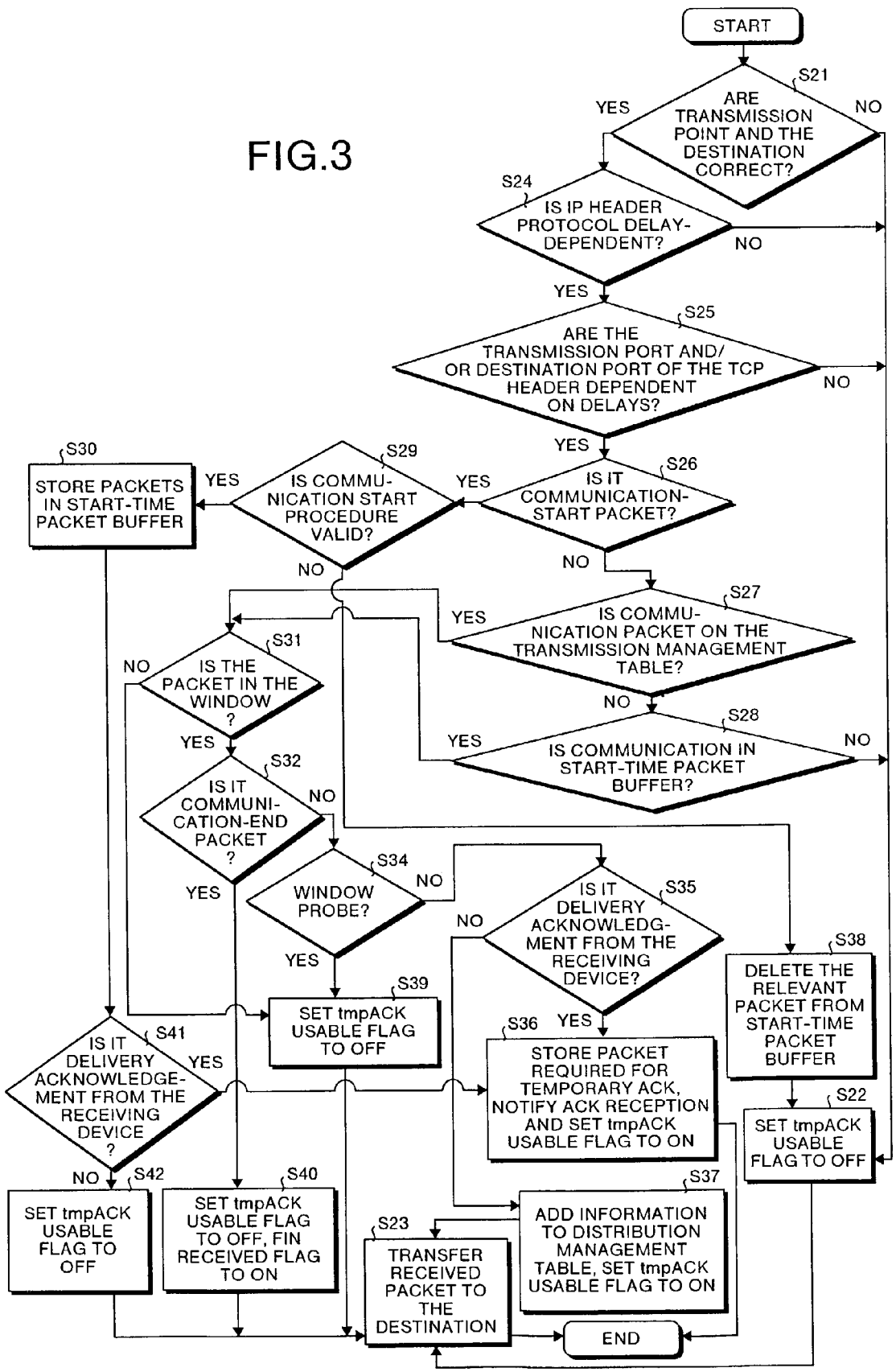
FIG. 3 is a detail flowchart of the check processing procedure for packets shown in FIG. 2.

FIG. 3 is a flowchart showing a packets checking procedure in step S11 shown in FIG. 2. In FIG. 3, it is decided whether the header of a received data packet is an IP header and whether the IP address is correct or not (step S21). In other words, it is decided whether a transmission point and a destination of the received data packet are correct. Should the transmission point and the destination of the received data packet be not correct (step S21, NO), the tmpACK usable flag is set to OFF (step S22), the received data packet is transferred to the destination (step S23), and a return is made to step S11. Incidentally, when the non-illustrated management table provided in the above-mentioned separate buffers or the same buffer, the tmpACK usable flag may be stored as information internal to this management table.

When the transmission point and the destination of the received data packet are correct (step S21, YES), the tmpACK use-decision section 12 uses the protocol management table 5 to decide whether the protocol of the IP header is delay-dependent (step S24). When the protocol of the IP header is delay-dependent (step S24, YES), reference is further made to a transmission point port and a destination port of the TCP header, and it is determined whether both the transmission point port and the destination port are delay-dependent or either one of the transmission point port and the destination port is delay-dependent (step S25). When the protocol of the IP header is not delay-dependent (step S24, NO) and the TCP header's transmission point port and/or destination port is not delay-dependent (step S25, NO), the tmpACK usable flag is set to OFF (step S22), the received data packet is transferred to the destination (step S23), and a return is made to step S11.

FIG. 4 shows an example of the decision table inside the protocol management table 5 used by the tmpACK use-decision section 12. In FIG. 4, a reference header item D1 shows the header portion used in deciding the data packet covered for decision. A protocol name item D2 shows a protocol type item of data in the header portion designated in the reference header item D1. Further, an item D3 for whether spoofing is allowed to be used represents information showing whether or not the protocol should use the return processing of tmpACK. The specific decision processing of steps S24 and S25 based on this decision table is explained below. First, in step S24, the tmpACK use-decision section 12 determines that the return processing of tmpACK can be used when referring to a byte string indicating the protocol of the IP header of the received data packet to decide that TCP data has been received and when referring to a transmission point port number of the TCP header portion in step S25 to decide that the data is not BGP. On the other hand, when BGP data has been received, it is determined that the return processing of tmpACK cannot be utilized.

Furthermore, when instep S24, a higher-order protocol in the protocol section of the IP header is judged not to be a delay-dependent protocol at the transmission gateway SG (step S24, NO), the tmpACK usable flag is set to OFF as aforesaid (step S22), the received data packet is transferred to the destination (step S23), and a return is made to step S31. On the other hand, when in step S24 the higher-order protocol is judged to be a delay-dependent protocol, and in step S25, it is judged not to be a delay-dependent protocol based on TCP header's transmission point port number, the tmpACK usable flag is set to OFF (step CS22), the data packet received is transferred to the destination (step S23), and a return is made to step S11.

In steps S24 and S25, when it is determined that the higher-order protocol is delay-dependent, reference is made to the value of code bit in the header portion of the received data packet to determine whether the data packet received is the data packet at a start of the communication (step S26). An exclusive buffer is provided as a non-illustrated start-time packet buffer. Alternatively, the receiving buffer 7, the transmission buffer 6 and/or other buffers may be used to substitute the non-illustrated start-time packet buffer. By the way, the data packets stored in non-illustrated start-time packet buffers may well be managed also by tagging them for classification by transmission devices, by receiving devices, by transmission device/receiving device combinations for communication, by communications where communication device and communication port, should they be identical, are defined as a communication unit, or by types of communication.

If the received data packet is determined not to be a communication start-time data packet (step S26, NO), the data packet received is checked to decide whether it is a communication already registered in the distribution management table 1 (step S27). In step S27, any communications where a combination of a transmission point IP in the IP header and the transmission point port in the TCP header and a combination of a destination IP and a destination port are wholly identical, are treated as the same unit of management and are judged as being registered communications.

FIG. 5 shows an example of a distribution management table. In FIG. 5, the items D11 through D15 are the items that represent the information concerning communications whose units of management are the same, while the items D11 through D18 represent the information obtained from the data packets that the transmission gateway SG has received. The item D11 represents the address of the IP transmission point of communication under management, the item D12 represents the IP address of the destination, the item D13 represents the transmission point port number, the item D15 does the destination port number. The item D14 represents the latest transmission window sizes and receiving window sizes of the transmission point and of the destination, respectively.

The item D16 represents the sequence number of the data segment that the transmission gateway SG has received in this communication, and the item D17 represents information on the transmission of tmpACK. Concerning the information in item D17, information on whether the data packet concerned is transferable and information on whether tmpACK has been transferred, etc., are used as values in cases including those where conditions are provided, such as where a certain set of conditions are arranged in relation to the transmission point. In addition, the item D18 represents information corresponding to delivery acknowledgement (RRACK) sent from the destination. In this regard, in FIG. 5, two values are provided, i.e., "ACK Received" and "ACK Waiting", the former to indicate that RRACK for the corresponding data packet has been received and the latter to indicate that arrival of RRACK is waited.

For instance, in FIG. 5, in the communication from the transmission port "FTP. DATA" of the transmission device "10.74.3.177" at the transmission point to the destination port "1301" of the receiving device "10.74.3.200" at the destination, the line DD1 indicates that the transmission window size and receiving window size of the transmission point and the transmission window size and receiving window size of the destination are invariably 16K-byte long, and that tmpACK for the data packet having sequence number "398" is "not permitted" to be transmitted. That is, this data packet indicates that tmpACK for this packet is not transmitted under any conditions and that arrival of a delivery acknowledgement from the destination is waited at this point of time.

By using the items described in the distribution management table 1 and other items to be added as necessary, the SG distribution management section 16 can perform management of the tmpACK for the data packets, confirmation of tmpACK reception, control of tmpACK retransmission in accordance with the results of the reception, control of transmission speed of tmpACK and of RRACK as a delivery acknowledgement from the destination to the transmission point, control of the speed of transferring the packet to the destination, and management of the transmission buffer 6 and the receiving buffer 7 of the transmission gateway SG.

By using the distribution management table 1, the transmission gateway SG refers to the transmission point IP address and the destination IP address both contained in the IP header of the received data packet and to the transmission point port number and the destination port number both contained in the TCP header, and on this basis, decides whether a communication represented by a combination of the transmission point IP in the IP header and the transmission point port in the TCP header and a combination of destination IP and destination port is present in the distribution management table 1. Should as a result of this decision the communication is found to be not registered in the distribution management table 1, a transfer is then made to step S28.

Further, when it is determined that the data packet received is the one registered in the distribution management table 1, a transfer is made to step S31, and it is determined whether the data packet received is the one in the receiving window of the destination. When the data packet is then judged to be the data packet in the destination's receiving window (step S31, YES), a transfer is made to step S32. When the data packet is judged to be in no way the data packet in the receiving window of the destination, the information pertaining to the data packet is registered in the distribution management table 1, the tmpACK usable flag is set to "OFF" (step S39), the data packet received is transferred to the destination (step S23), and a return is made to step S11.

On the other hand, in step S27, when the data packet received is judged to be not a communication registered in the distribution management table 1, it is determined whether the data packet belongs to any of the communications stored in the non-illustrated start-time packet buffers (step S28) If the data packet is judged to be in no sense a data packet not belonging to any of the communications stored in the non-illustrated start-time packet buffer (step S28, NO), the tmpACK usable flag is turned "OFF" (step S22), the data packet received is transferred to the destination (step S23) and a return is made to step S11.

In step S28, when the data packet is judged to be a communication present in the non-illustrated start-time buffer, it is further determined whether the data packet is the one in the window (step S31, YES). If it is determined that the data packet is the one in the window (step S31, YES), a still further determination is made whether the data packet is the one at the end of communication (step S32). When the data packet is judged to be such a communication-end data packet (step S32, YES), the entry of the data packet received is registered. The data packets which have turned to be tmpACK-usable because of the entry of data packet of the same communication and for which the transmission of tmpACK has not been made are invariably rendered tmpACK-unusable, the tmpACK-usable flag of the transmission gateway SG is turned "OFF", the FIN received flag is turn "ON" (step S40), the data packet received is transferred to the destination (step S23), and a return is made to step S11.

On the other hand, when in step S32 the data packet is judged to be anything but a communication-end data packet, a transfer is made to step S34. When further in step S28 it is decided that the data packet is not a communication present in the non-illustrated start-time packet buffer, the tmpACK usable flag of the transmission gateway SG is turned "OFF" (step S22), the data packet received is transferred to the destination (step S23), and a return is made to step S11.

In step S34, the data packet received is checked to decide whether it is a window probe, and if it is decided that it is a window probe (step S34, YES), the tmpACK usable flag of the transmission gateway SG is set to "OFF" (step S39), the data packet received is transferred to the destination (step S23) and a return made to S11.

On the other hand, when in step S34 it is decided that the data packet is not a window probe, it is decided whether the data packet received is the delivery acknowledgement from the receiving device C2 (step S35). When the data packet received is found to be the delivery acknowledgement from the receiving device C2 (step S35, YES), the data packet received is stored in the tmpACK buffer 4, an event is caused to happen to notify the SG distribution management section 16 in the transmission gateway SG of reception of the delivery acknowledgement from the receiving device C2 (step S45), the tmpACK usable flag is set to "ON" (step S36) and a return is made to step S11. The storage of data packets in the step S36 and the notification of ACK reception are performed through the processing of ACK reception notification and ACK-specific packet preparation shown in FIG. 6. In other words, to begin with, an event is caused to occur to notify that ACK has been received from the receiving device C2 (step S45). With the generation of this event, an execution is made of the reception confirmation processing and retransmission processing shown in FIG. 13. After this, it is decided whether the packet stored in tmpACK buffer 4 has had its data transferred (step S46). When the data has been transferred (step S46, YES), the packet is exchanged to one for temporary ACK use (step S47) and the processing is finished. Contrarily, if the data has not been transferred (step S46, NO), it is decided whether the data is attached to ACK (step S48). If the data is found attached to ACK (step S48, YES), the packet is retained for temporary ACK use (step S49) and the processing is finished. If the data has not been attached to ACK (step S48, NO), then and there the processing is finished.

By the way, in the processing of step S36, it is possible, through installation, to retain, for example, the IP header and the IP data portion alone or other necessary portions alone. Also, it is determined, by sequence number, etc., whether the data packet now received is later than the one that has already been registered for tmpACK preparation and thereby the newest, namely the latest data packets in sequence may be registered as data packets for tmpACK preparation. In step S35, when the data packet received is found to be anything but a delivery acknowledgement from the receiving device C2 (step S35, NO), it is also possible to store the data packet received in the tmpACK buffer 4 as tmpACK preparation use and utilize the stored data in the preparation of tmpACK.

In step S35, when the data packet received is judged to be anything but a delivery acknowledgement from the receiving device C2, the information is registered in the distribution management table 1, the tmpACK usable flag is set to "ON" (step S37), the data packet received is transferred to the destination (step S23) and a return is made to step S11. By the by, the data packet that has turned the tmpACK usable flag "ON" is stored in the transmission buffer 6. In the processing of step S37, it may also be well to set, through installation, the information concerning whether the tmpACK is usable every time the information on separate data packets in the distribution management table 1 makes an entry as information regarding the arrival timings of the latest data packets.

On the other hand, when in step S26 the data packet received is judged to be a communication start data packet, it is decided whether the communication start data packets, including the data packets currently under judgment, are validly transmitted and received in accordance with the procedure of communications (step S29). And only those communication start data packets whose arrival in valid sequence has been confirmed through a range of operations are stored in non-illustrated start-time packet buffers (step S30). Accordingly, in the decision involving this step S29, the only thing that needs to be checked is whether the data packet received is the data packet for the initial communication start or whether it is the data packet to be received next to the data packet for communication start received the last in the same communication. Subsequently, it is decided whether the data packet received is a delivery acknowledgement from the receiving device C2 (step S41), and if as a result the data packet received is judged to be the delivery acknowledgement from the receiving device C2 (step S41, YES), the processing of the above-mentioned step S36 is performed and a return made to step S11. When contrarily it is judged to be in no way the delivery acknowledgement from the receiving device C2 (step S41, NO), the tmpACK usable flag of the transmission gateway SG is turned "OFF" (step S42), the data packet received subsequently is transferred to the destination (step S23) and a return made to step S11.

On the other hand, when in step S29 it is judged that the transmission gateway SG has not received communication start data packets in a valid sequence, those data packets then are deleted from non-illustrated start-time packet buffers should they be found to belong to the same communication with the, data packet received (step S38), the tmpACK usable flag of the transmission gateway SG is turned "OFF" (step S22), the data packet received is transferred to the destination (step S23) and a return made to step S11.

Figure 7:
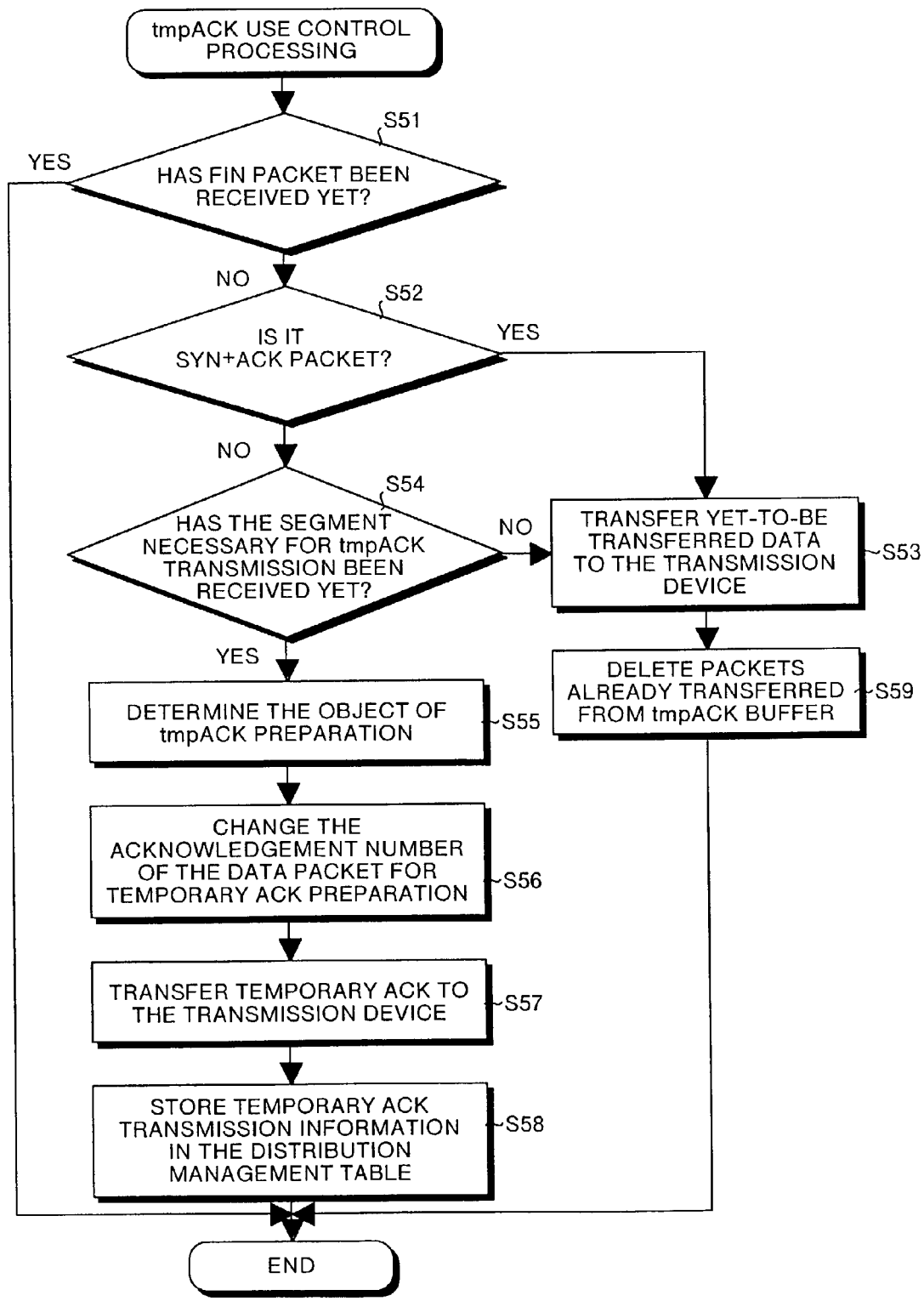
FIG. 7 is a detail flowchart of the tmpACK use control processing procedure given in FIG. 2.

Now, the flowchart in FIG. 7 is referred to and an explanation is given about the detailed sequence of tmpACK use control processing executed in step S13 shown in FIG. 2. FIG. 7 shows the processing performed in the preparation and transmission of tmpACK in the case where the method of delayed temporary ACK is not employed. Here delayed temporary ACK means that similarly to the method of delayed ACK in TCP, reception is waited for a certain period of time or by certain numbers of packets before temporary ACK (tmpACK) is prepared and transmitted, the object being to promote the reduction of transmission gateway SG processing and the flow to and from the transmission gateway SG.

In FIG. 7, the value of the FIN received flag set by a series of processes shown in FIG. 3 is referred to and it is decided whether the communication end data packet has been received (step S51). When it is decided that the FIN packet has been received (step S51, YES), then and there a return is made to step S13. In the meantime, when the decision made is that the FIN packet has not been received (step S51, NO), it is decided whether or not the data packets stored in the tmpACK buffer 4 are a SYN data packet and ACK data packet ((SYN+ACK) packet) (step S52). If the data packet stored is the (SYN+ACK) packet (step S52, YES), the yet-to-be transferred (SYN+ACK) packet is transferred to the destination, i.e., the transmission device C1 (step S53), on completion of which the transferred (SYN+ACK) packet is deleted from the tmpACK buffer 4 (step S59) and a return is made to S13. Incidentally, by the yet-to-be transferred data (packet) is meant a piggyback packet. On the other hand, when in step S52 the data packet stored in the tmpACK buffer is judged as not a (SYN+ACK) packet (step S52, NO) then a decision is further made as to whether the data segment necessary for the transmission of tmpACK has been received or not (step S54).

In step S52 processing, the distribution management table 1 is referred to and by using the segments count variables necessary for tmpACK transmission, it is decided whether the data segments necessary for tmpACK transmission have been received. Here the segments count variable necessary for the transmission of tmpACK is the value possessed by the transmission gateway SG, a value equaling or exceeding "0" that indicates how many more data segments must be received before the transmission gateway SG prepares and transmits tmpACK corresponding to the data segment received from the transmission device C1. For instance, given that the value of segments count variable is "1", for the transmission gateway SG to prepare and transmit tmpACK corresponding to the "N"th data segment, the fact of at least the "N+1"th data segment having been received at the transmission gateway SG and of the "N+1"th data segment being not a FIN data segment constitutes the necessary condition for processing the preparation and transmission of tmpACK corresponding to the "N"th data segment. The segments count variable necessary for tmpACK transmission, therefore, is the value that shows how many more data segments there are, besides N, for the transmission gateway SG to receive.

Figure 8:
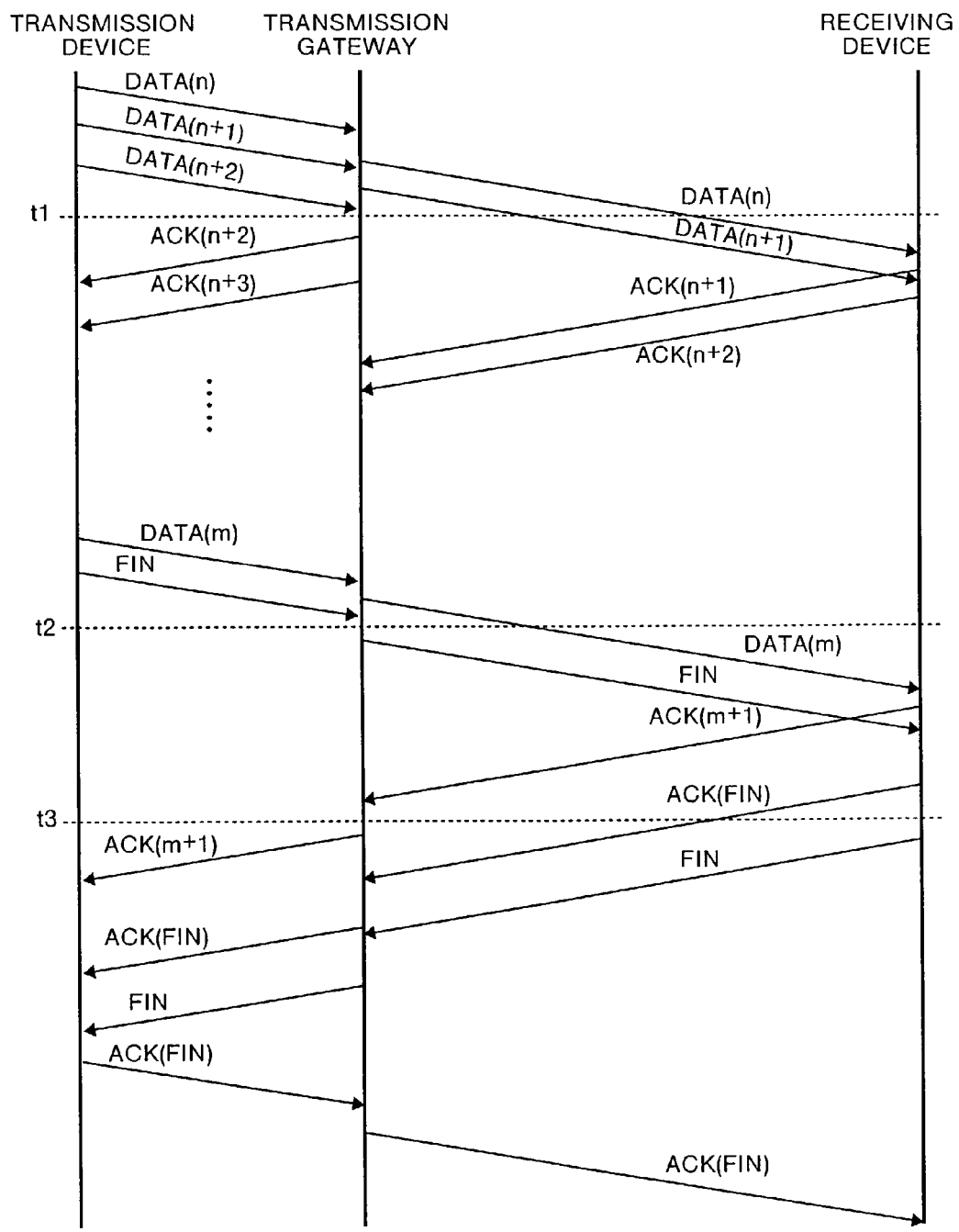
FIG. 8 shows an example of protocols where the segments count variable required for tmpACK transmission is set to [1]

An example of protocols in the case where the segments counts variable necessary for the transmission of tmpACK stands at "1" will be explained below with reference to FIG. 8. To begin with, the transmission gateway SG confirms the receipt of all data segments including and up to data (n+1) from the transmission device C1 and transmits them to the receiving device C2. Further, the transmission gateway SG prepares ACK (n+2) which is the tmpACK corresponding to data (n+1).

After this, at the point of time t1 where the receipt of data (n+2) is confirmed, the transmission gateway SG transmits ACK (n+2), which is tmpACK, to the transmission device C1.

The receiving device C2 on its part receives the data (n+1), prepares ACK (n+2) and transmit this to the transmission gateway SG.

When this ends, the transmission gateway SG receives data (m) from the transmission device C1, transmits the data (m) to the receiving device C2 and waits for the receipt of data (m+1). After this, the transmission gateway SG confirms that the data (m+1) is a FIN segment, subsequent to which tmpACK is not prepared nor transmitted. In addition, the transmission gateway SG transmits the FIN to the receiving device C2 (at the point of time t2).

When this is accomplished, the receiving device C2 receives data (m), prepares ACK (m+1) and transmits this to the transmission gateway. In response, the transmission gateway SG receives ACK (m+1) and transmits ACK (m+1) to the transmission device C1 (at the point of time t3).

Now, to return to FIG. 7, when in step S54 it is decided that the data segment necessary for tmpACK transmission has not yet been received, the yet-to-be transferred ACK data packet in the tmpACK buffer 4 is transferred to the transmission device C1 (step S53), the ACK data packet thus transferred being then deleted from the tmpACK buffer 4 (step S59) and a return is made to step S13.

On the other hand, when in step S54 it is judged that the data segment necessary for tmpACK transmission has been received, the data segment received from transmission device C1 for coverage in the preparation of tmpACK is determined (step S55). In the processing of step S55, the distribution management table 1 is used and reference is made to the state of reception at the transmission gateway SG, to the state of transmission of tmpACK, and to the SACK option, etc., of TCP protocols between the transmission device C1 and the receiving device C2. For example, in the case where the segments count variable necessary for the transmission of tmpACK is "1" and in which communication is without SACK options, those data segments, among all entries in the distribution management table 1, which are in a state of waiting for ACK reception, which have not yet been transmitted, the sequence numbers of which are smaller than their intrinsic sequence numbers and which are all received at the transmission gateway SG are check to determine the data segment whose sequence number is the second largest to make it the object to be covered in the preparation of tmpACK.

Moreover, given that the segments count variable necessary for the transmission of tmpACK is "1" in the communication provided with SACK options, those data segments, among all entries in the distribution management table 1, which are in the state of waiting for ACK reception, which have not yet been transmitted, the sequence numbers of which are smaller than their intrinsic sequence numbers, which are not received at the transmission gateway SG, and whose segment assemblies having serial sequence numbers are not more than four, may well be checked also to determine the data segment whose sequence number is the second largest so as to make this data segment the object to be covered in the preparation of tmpACK.

When processing in step S55 is ended, the delivery acknowledgement number of the data segment stored in the tmpACK preparation buffer 4 is changed to the number in which "1" is added to the sequence number of the data segment as the object to be covered in the preparation of tmpACK as decided in step S55, then the data segment with the changed sequence number is prepared as tmpACK. In the case of TCP with SACK options, it may also be well to determine in step S55 the data segment for tmpACK preparation in which the SACK options are considered and, in step S56, to prepare a delivery acknowledgement with SACK options added.

After the processing in step S56, the tmpACK is transmitted to the transmission device C1 (step S57), all information on the data segments entered in the distribution management table 1, corresponding to the tmpACK transmitted, has its setting changed to the tmpACK transmitted (step S58), and a return is made to step S13.

Figure 9:
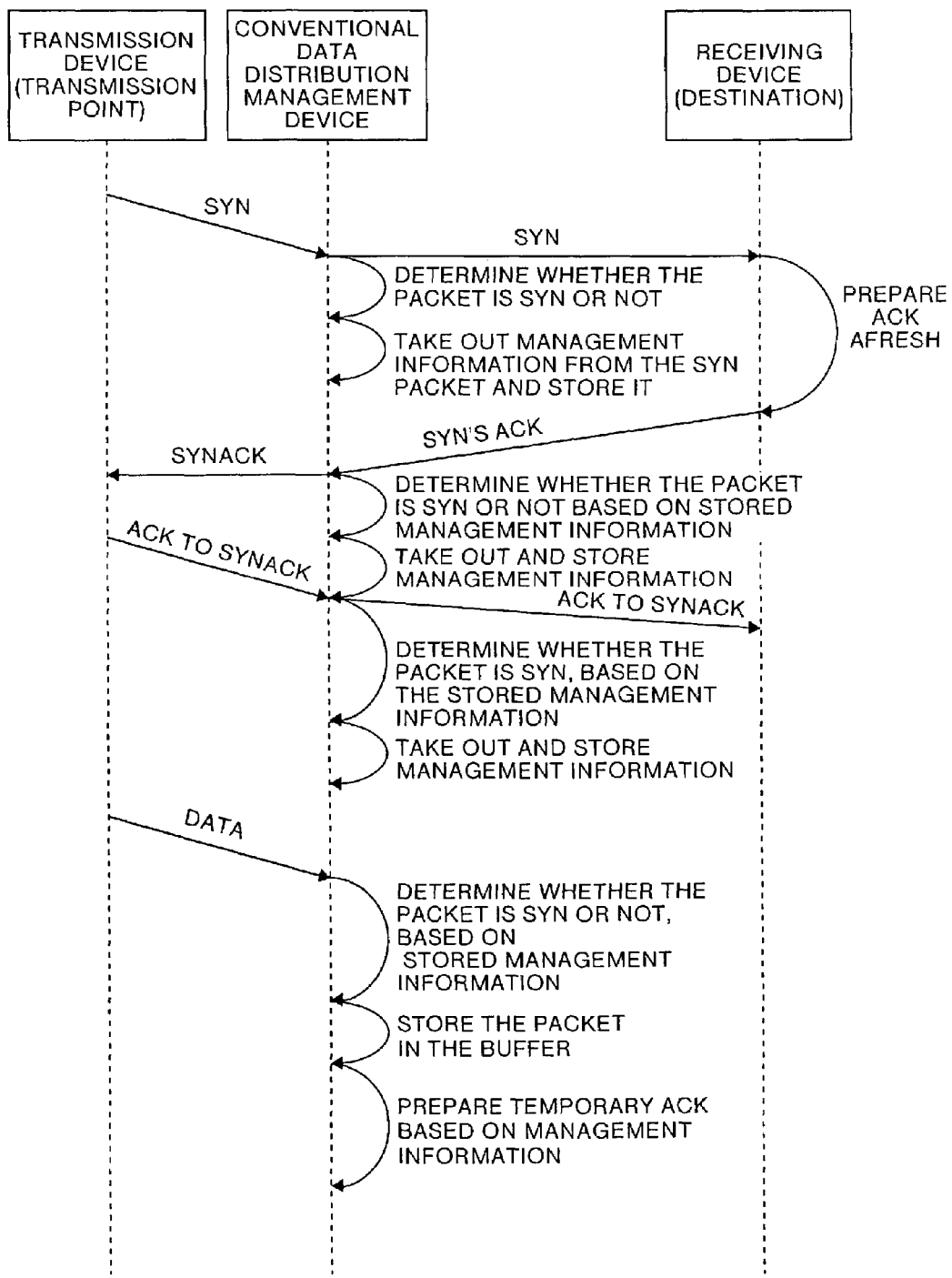
FIG. 9 is a sequence diagram showing the procedure of how to acquire and manage connection information during conventional communications connection.
Figure 10:
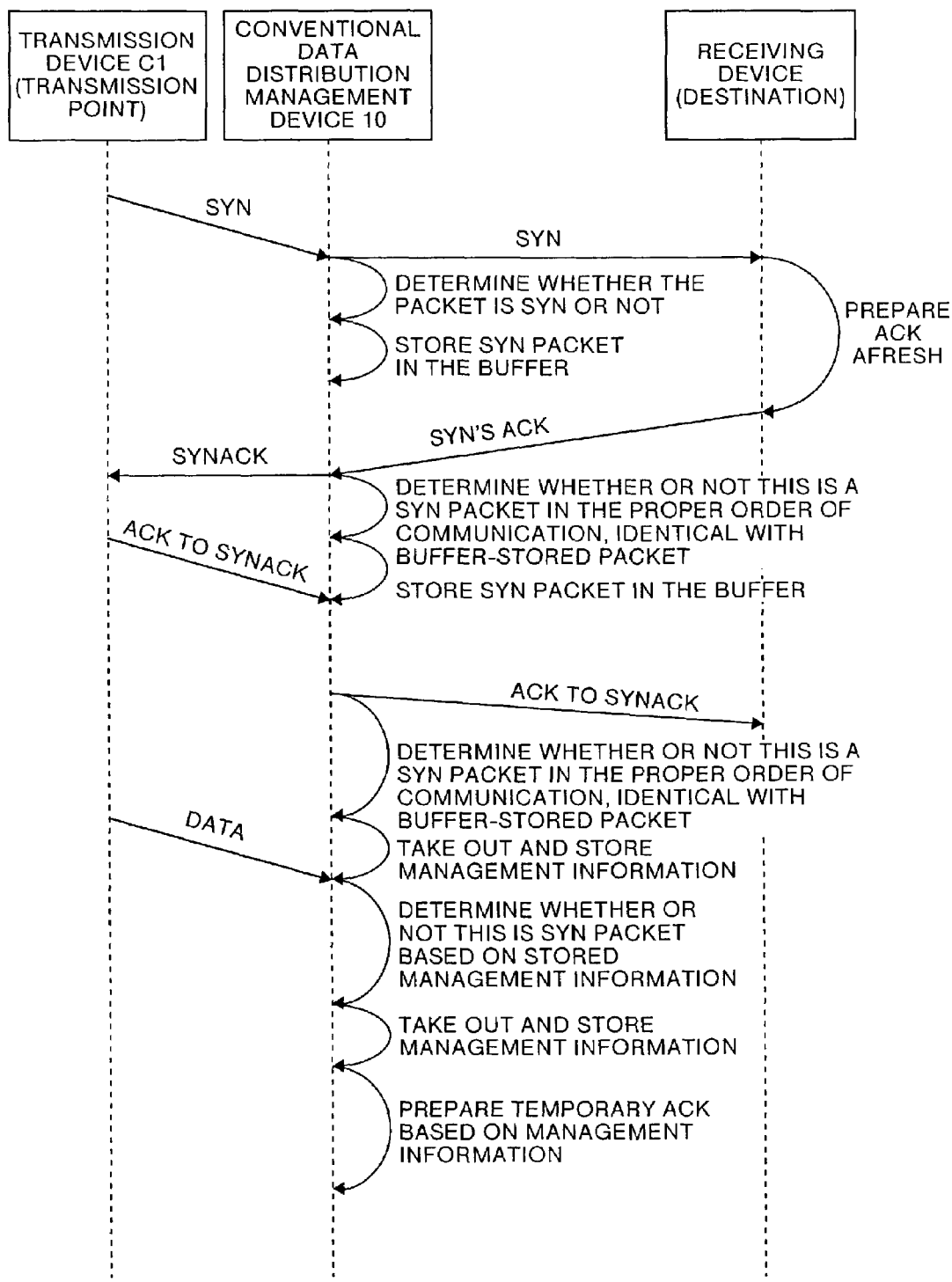
FIG. 10 is a sequence diagram showing the procedure of how to acquire and manage connection information during the communications connection according to the first embodiment of this invention.

The acquisition and management of connections information at communications connection are explained with reference to the sequence charts in FIGS. 9 and 10. FIG. 9 is a sequence chart showing the procedure in which connections information is acquired and managed at conventional communications connection, and FIG. 10 is a sequence chart of the procedure in which connections information is acquired and managed in the first embodiment. The acquisition and management of connections information at communications connection mainly correspond to the processing of steps S29 and S30 shown in FIG. 3.

As FIG. 9 shows, the conventional data distribution management device, in response to reception of a SYN packet from the transmission device, transfers the SYN packet to the receiving device and simultaneously decides whether the SYN packet received is genuinely a SYN packet. If it is judged so, the conventional data distribution management device takes out the management information concerning connections management and stores it in a buffer. This management information involves the IP addresses, port numbers or other connections identifications of the transmission point and of the destination, and other information necessary for connections management derived from the SYN packets at, for example, the reception of an initial SYN packet. By the way, the packets from which management information is taken out are limited to the SYN packet. Subsequently, the conventional data distribution management device receives the ACK packet of the SYN packet sent from the receiving device, transfers it as SYNACK to the transmission device, decides whether the packet is a SYN packet based on the management information stored in the buffer, and takes out and stores the management information. At this time, the conventional data distribution management device accepts ACK corresponding to the SYNACK from the transmission device, transfers the ACK corresponding to the SYNACK to the receiving device, decides whether the packet is a SYN packet based on the management information stored in the buffer, and takes out and stores the management information. After that, at the point of time when communication is established, data is sent from the transmission device, in corresponding to which the conventional data distribution management device decides whether the data sent thereto is a SYN packet based on the management information stored in the buffer, stores the data packet received in the buffer based on the decision results, and performs the preparation of a temporary ACK based on the management information.

By contrast, in the first embodiment, as FIG. 10 shows, as soon as a SYN packet is received from the transmission device C1, the data distribution management device, similarly to the conventional device, decides whether the SYN packet received is a SYN packet at all and when it is judged to be a real SYN packet, stores the SYN packet in the buffer, but at this time, unlike the conventional counterpart, the data distribution management device does not take out the management information from the SYN packet but stores the SYN packet itself as a whole in the buffer. Subsequent to that, the data distribution management device 10 receives the ACK packet of the SYN packet sent from the receiving device C2, transfers the packet as SYNACK to the transmission device C1, decides whether the packet received is a validly sequenced SYN packet having the same communication with the packet stored in the buffer, and if it is found to be a SYN packet with a valid sequence, stores this SYN packet in the buffer. At this point of time, the data distribution management device 10 accepts ACK corresponding to SYNACK from the transmission device C1, transfers the ACK corresponding to the SYNACK to the receiving device C2 and decides whether the ACK is a validly sequenced SYN packet having the same communication with the packet stored in the buffer. Only when the packet is judged to be a SYN packet of a valid sequence, namely only when communication has been established, the management information is taken out from the SYN packet and stored in the buffer. After that, when subsequent to the establishment of this communication, data is sent from the transmission device C1, it is decided based on the buffer-stored management information, whether the packet is a SYN packet at all, and based on the result of the decision, management information is taken out from the data packet received and stored in the buffer, and a temporary ACK is prepared based on this management information.

Accordingly, in this first embodiment, management information is not taken out from the SYN packet at a start of communication prior to the establishment of communication, but the SYN packet is itself stored as a whole in the buffer to have the advantage of simplified processing at the start of communication.

Figure 11:
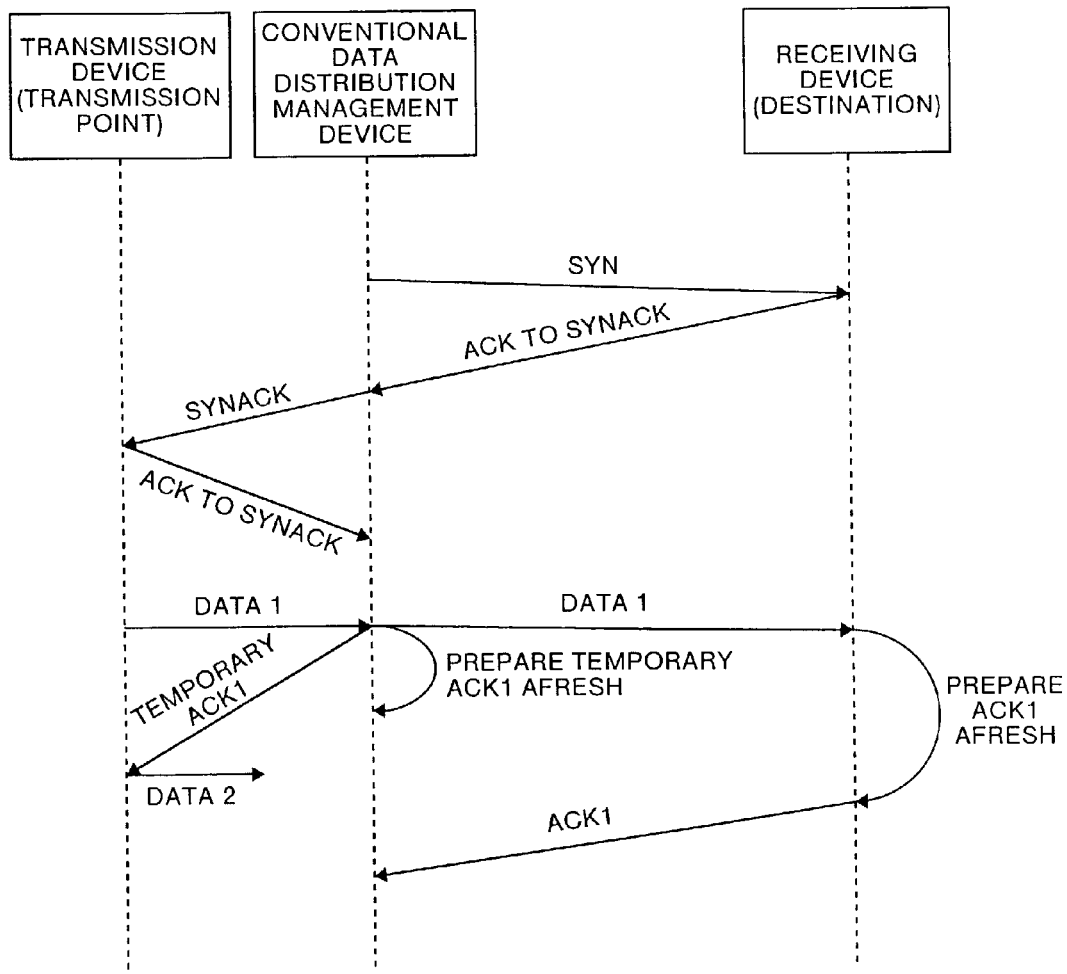
FIG. 11 is a sequence diagram of the conventional temporary ACK preparation processing procedure after communication is established.
Figure 12:
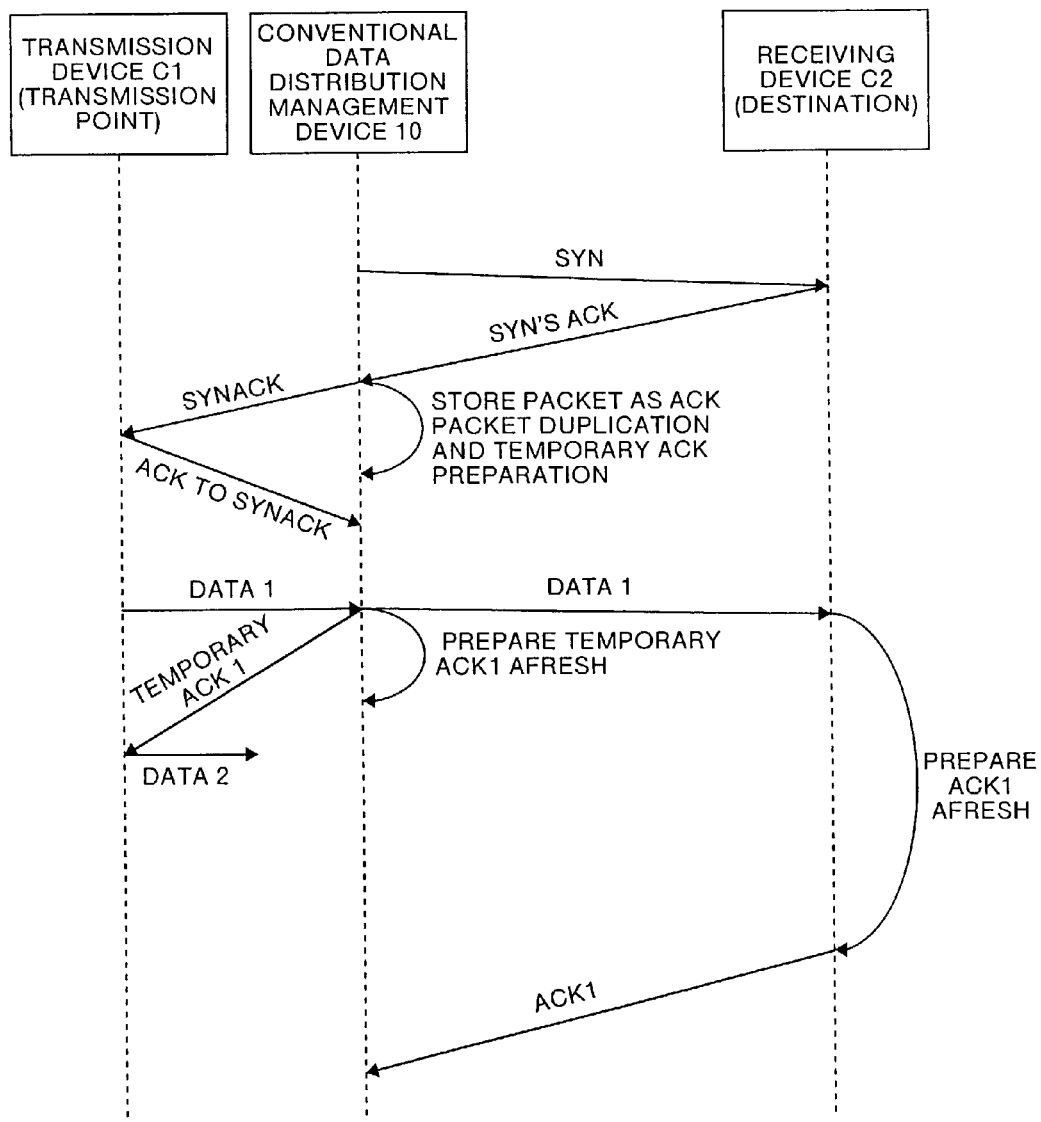
FIG. 12 is a sequence diagram of the temporary ACK preparation processing procedure after communication is established according to the first embodiment of this invention.

Similarly, by referring to the sequence diagrams given in FIGS. 11 and 12, the process of temporary ACK preparation is considered. FIG. 11 is a sequence diagram showing the conventional procedure in which a temporary ACK is prepared after communication is established. FIG. 12 is a sequence diagram of first embodiment in which temporary ACK is prepared after communication is established. By the way, the preparation of temporary ACK after communication is established mainly corresponds to the processing in step S35 in FIG. 3.

As FIG. 11 shows, conventionally, when data is sent from the transmission device after communication is established, the data distribution management device transfers the data to the receiving device and at the same time newly prepares temporary ACK corresponding to the data by using the management information stored in the buffer, and sends the temporary ACK to the transmission device. On receipt of the temporary ACK, the transmission device sends the next data to the conventional data distribution management device. In the meantime, on receipt of the data from the conventional data distribution management device, the receiving device newly prepares ACK and sends it to the conventional data distribution management device.

By contrast, in the first embodiment, as FIG. 10 shows, as soon as a SYNACK is received from the reception device C2, the data distribution management device prepares a temporary ACK packet, copies this temporary ACK packet as a model of temporary ACK packet, and stores the copy in the tmpACK buffer 4 for use in temporary ACK preparation. When a data is sent from the transmission device C1 after communication's establishment, the data distribution management device transfers the data to the receiving device C2 and at the same time newly prepares a temporary ACK corresponding to this data. Specifically, the sequence number, acknowledgement number, code bit flag, etc., of the ACK packets copied and retained in the tmpACK buffer are renewed to prepare temporary ACK. By the by, in the case (the case of piggyback) where a data portion is included in the temporary ACK packets stored in the tmpACK buffer 4, this data portion is deleted after the temporary ACK is transmitted. And when the next ACK arrives, the packet stored in the tmpACK buffer 4 is replaced accordingly. Since it is not necessary to limit the number of packets stored in the tmpACK buffer 4 to one, however, packets may be left to increase before they are deleted together, leaving one packet alone, or before they are finally deleted altogether.

Accordingly, in this first embodiment, the temporary ACK packet is copied as a model, the model is then stored in the tmpACK buffer 4, renders the subsequent preparation of temporary ACK packets easy and, in addition, dissolves the contradictions between the already prepared original temporary ACK packets and the temporary ACK packets to be prepared henceforth.

Figure 13:
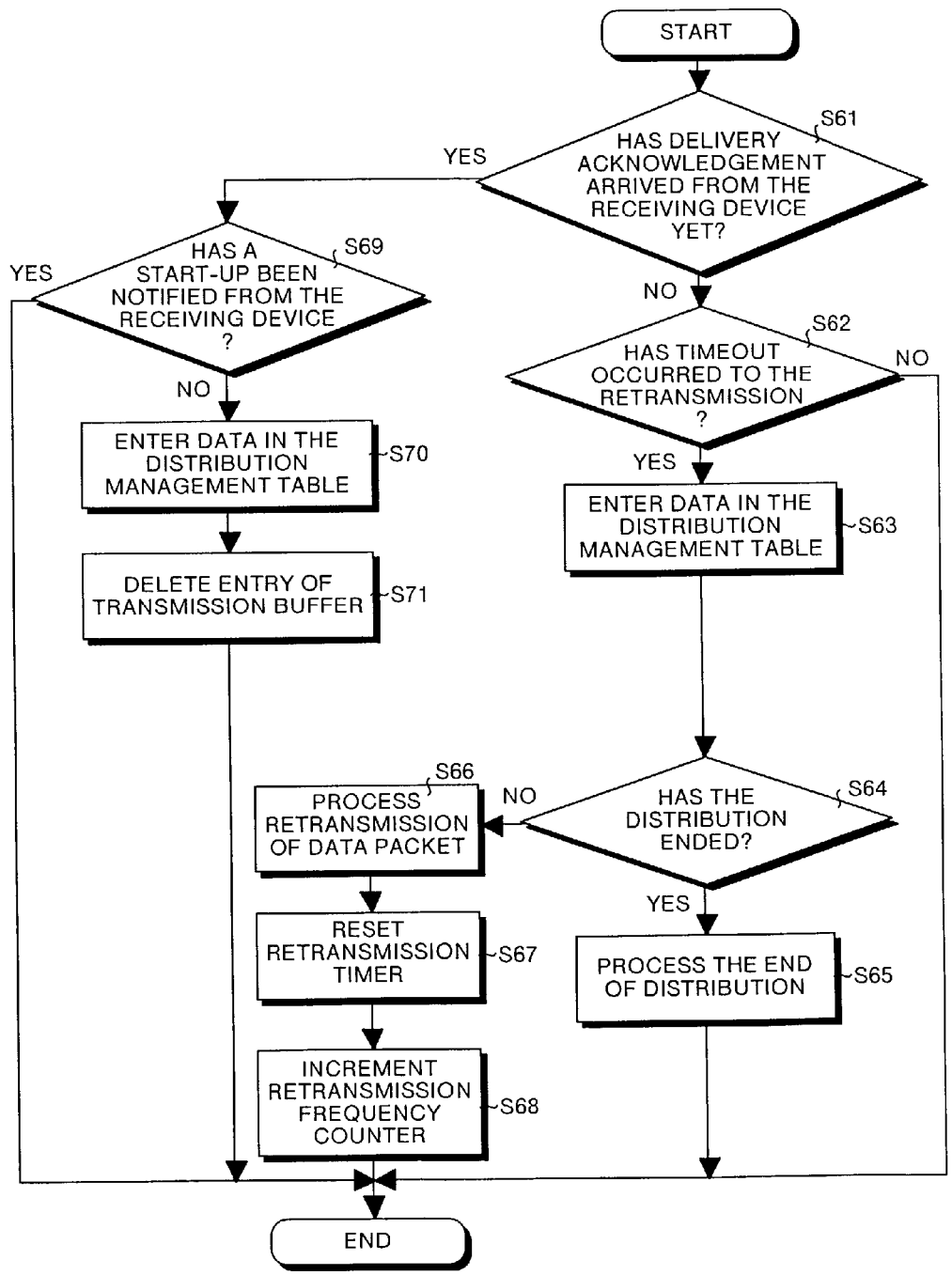
FIG. 13 is a flowchart showing the procedures in which reception confirmation and retransmission control are processed by the data distribution management device in FIG. 1.

Now by referring to the flowchart in FIG. 13, an explanation is to follow regarding the procedure in which receptions are confirmed at the SG distribution management section 16 of the transmission gateway SG and whereby retransmission control is exercised based on the outcome of the above. The reception confirmation and retransmission control are processed in parallel with the process of checking packets and of controlling tmpACK use in FIG. 2.

In FIG. 13, it is decided whether the event (refer to step S45) that shows the arrival of delivery acknowledgement from the receiving device C2 has been received (step S61) This event is one that is caused to occur in the process of checking packets in step S11. In the case of delivery acknowledgement having reached (step S61, YES), it is decided whether it is a start notification from the receiving device C2 (step S69), and if it is a start notification (step S69, YES), this processing is ended. On the other hand, if it is determined otherwise than a start notification from the receiving device C2 (step S69, NO), the result relevant to the data segment that the received delivery acknowledgement indicates is entered (step S70) in the distribution management table 1. For example, in the case of communication that does not have SACK options, all data segments—but of the entries in the distribution management table 1—which are in a state of waiting for ACK reception and whose sequence number is smaller compared with the data segments that the received delivery acknowledgement indicates, are judged as the segments that have received ACK. Contrastingly, in the case of communication that has SACK options, all data segments—out of the entries in the distribution management table 1—which are in a state of waiting for ACK reception, whose sequence number is smaller compared with the data segments that the received delivery acknowledgement indicates, and which have no SACK options, are judged as ones that have received ACK.

After the processing in step S70, the ACK received segments out of the entries in the distribution management table 1 are deleted from the transmission buffer 6 (step S71).

On the other hand, when in step S61 it is decided that the event of receiving delivery acknowledgement from the receiving device C2 has not been received, a decision is further made as to whether a retransmission timeout has occurred (step S62). When the retransmission timeout has not occurred (step S62, NO), then and there this processing is ended. Contrarily, when it is decided that the retransmission timeout has occurred (step S62, YES), the number of retransmissions of entries of the data segments wherein the timeout as given in the distribution management table has occurred is incremented, the retransmission flag is turned "ON" (step S63), and it is decided whether the distribution is ended (step S64). In the case where the interchange of distribution-end data packets in normal TCP communication is detected, or in which the timeout of retransmission is repeated and so the transmission gateway SG terminates the distribution through retransmission retrial, it is judged that the distribution has ended (step S64, YES), distribution-end processing is performed (step S65), and the processing is terminated. By the way, the value of retransmission timeout and the number of times of retry-out must be set to a sufficiently extended level compared with the value of retransmission timeout and the number of times of retry-out in the transmission device C1 and receiving device C2.

The processing in step S65 is performed differently depending on the state of an ending of distribution. When the interchange of the distribution-end data packets in normal TCP communication is detected, the data segments in communication to be terminated with respect to the tmpACK buffer 4, transmission buffer 6 or receiving buffer 7 are invariably deleted, with the entries of the distribution management table 1 deleted as well.

In the meantime, in step S64, when it is decided that distribution is not ended, the retransmission processing in steps S66 through S68 are performed. In other words, in step S66, where the retransmission flag of the distribution management table 1 is "ON", data segments of distribution buffer 6 are retransmitted to turn "OFF" the transmission flag of the distribution management table 1. With the end of this step S66 processing, a retransmission timer is reset (step S67), a retransmission frequency counter of the transmission gateway SG is incremented (step S68), and this processing is finished.

Figure 14:
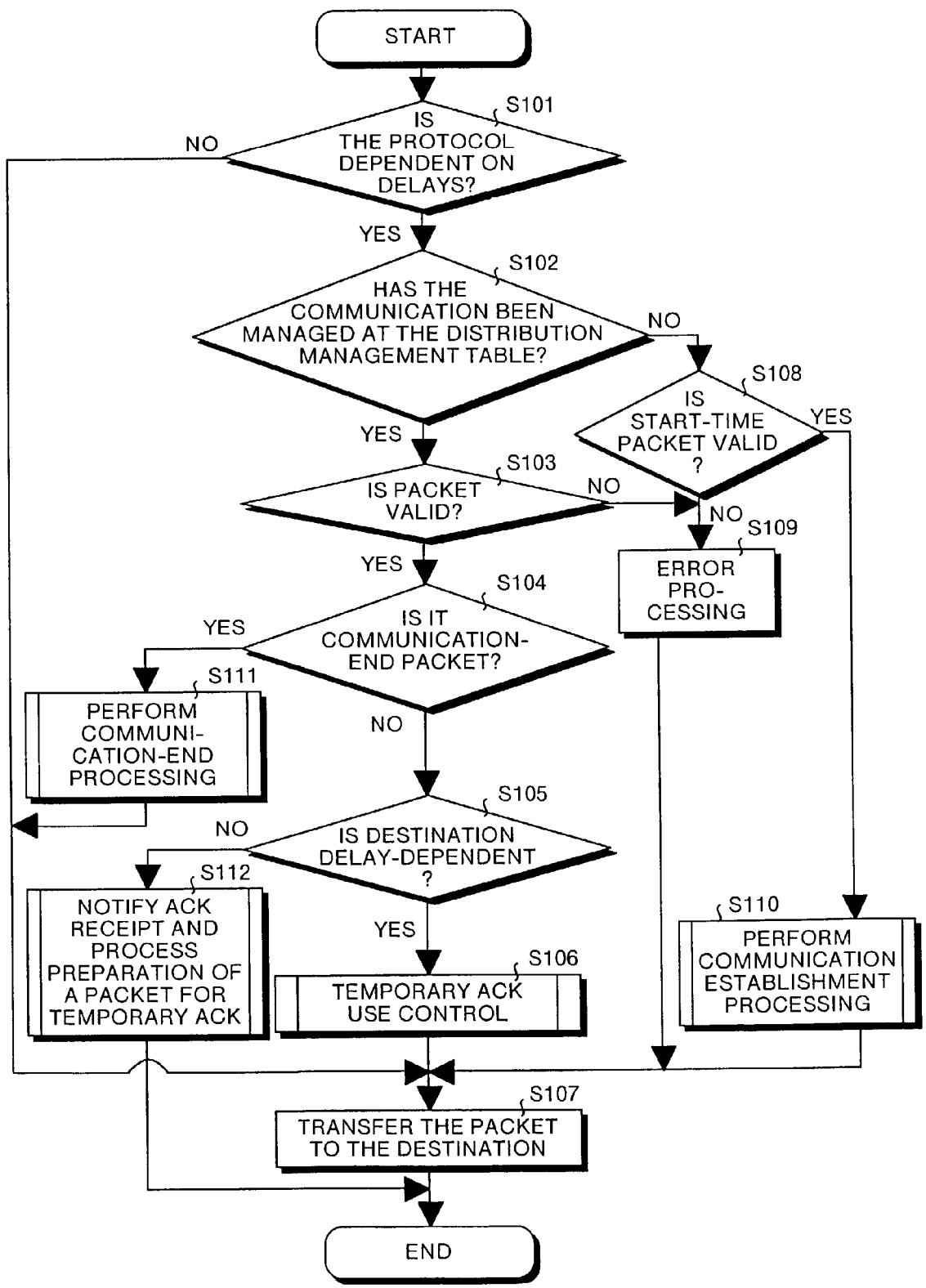
FIG. 14 is a flowchart outlining the general processing of the data distribution management device according to the first embodiment of this invention.

By referring to the flowchart of FIG. 14, an explanation is made pertaining to the outlines of the general processing in the first embodiment. To begin with, it is decided whether, in relation to steps S24 and S25 in FIG. 14, the protocol of the IP header is a delay-dependent protocol, or whether the transmission point port and/or destination port of the TCP header are delay-dependent (step S101). For instance, concerning one of the applications on UDP, it may also be well to make further detailed decision by using a protocol decision table targeted on spoofing.

Should the protocol of the IP header be not a delay-dependent protocol, or should the transmission point port and/or destination port of the TCP header be neither delay-dependent (step S101, NO), a processing is performed to transfer the received packet to the destination (step S107) and terminate this processing. Contrarily, should the protocol of the IP header be a delay-dependent protocol and should the transmission point port and/or destination port of the TCP header be also delay-dependent (step S101, YES), it is decided, corresponding to step S27, whether the received data packet in a communication has been managed at the distribution management table 1 (step S102).

When the received data packet in the communication has not been managed at the distribution management table 1 (step S102, NO), a decision is further made whether the packet is a valid communication-start time packet corresponding to steps S28 and S29 (step S108). Given that the packet is found to be a valid communication-start time packet (step S108, YES), the establishment of communication corresponding to steps S30, S36 and S37 is processed (step S110), on completion of which the packet received is transferred to the destination (step S107) and this processing is terminated. Contrarily, should the packet received be not a valid communication-start time packet (step S108, NO), error processing is performed (step S109). Specifically, in this error processing, when packets are imperfectly received at the destination, the data is deleted from the distribution management table 1 and from the start-time packet buffer and the process of spoofing is stopped. After that, a transfer is made to step S107, the packet received is transferred to the destination, and this processing is ended.

On the other hand, when the received data packet in the communication has been managed at the distribution management table 1 (step S102, YES), a decision is then made whether the packet received is a valid packet (step S103). This decision represents a syntax check that TCP makes, including decision processing in steps S21 and S31. Should the decision be that the packet is not valid (step S103, NO), error processing is performed (step S109), the packet received is transferred to the destination (step S107) and this processing is ended.

When the packet received is judged to be valid (step S103, YES), a decision is then made whether the packet received is a communication-end packet (step S104). This decision corresponds to the processing of decision in step S32. To specify, this decision is made by the FIN reception flag that turns "ON" at the point in time at which the FIN reception flag of the packet and the initial FIN packet are received. When here the packet received is found to be a communication-end packet (step S104, YES), communication-end processing is performed (step S111), the packet is transferred to the destination (step S107), and this processing is terminated. This communication-end processing is a process that corresponds to step S40 and in the case of end-related packet, the FIN reception flag turns "ON" at the point in time at which the initial FIN packet is received, and in the procedure similar to TCP, packets are transferred to the destination (the transfer being made to proceed to the next processing) until the decision of communication termination is made. At the end of the communication, similarly to the time wait processing, information is deleted from the buffers and from distribution management table 1.

Figure 6:
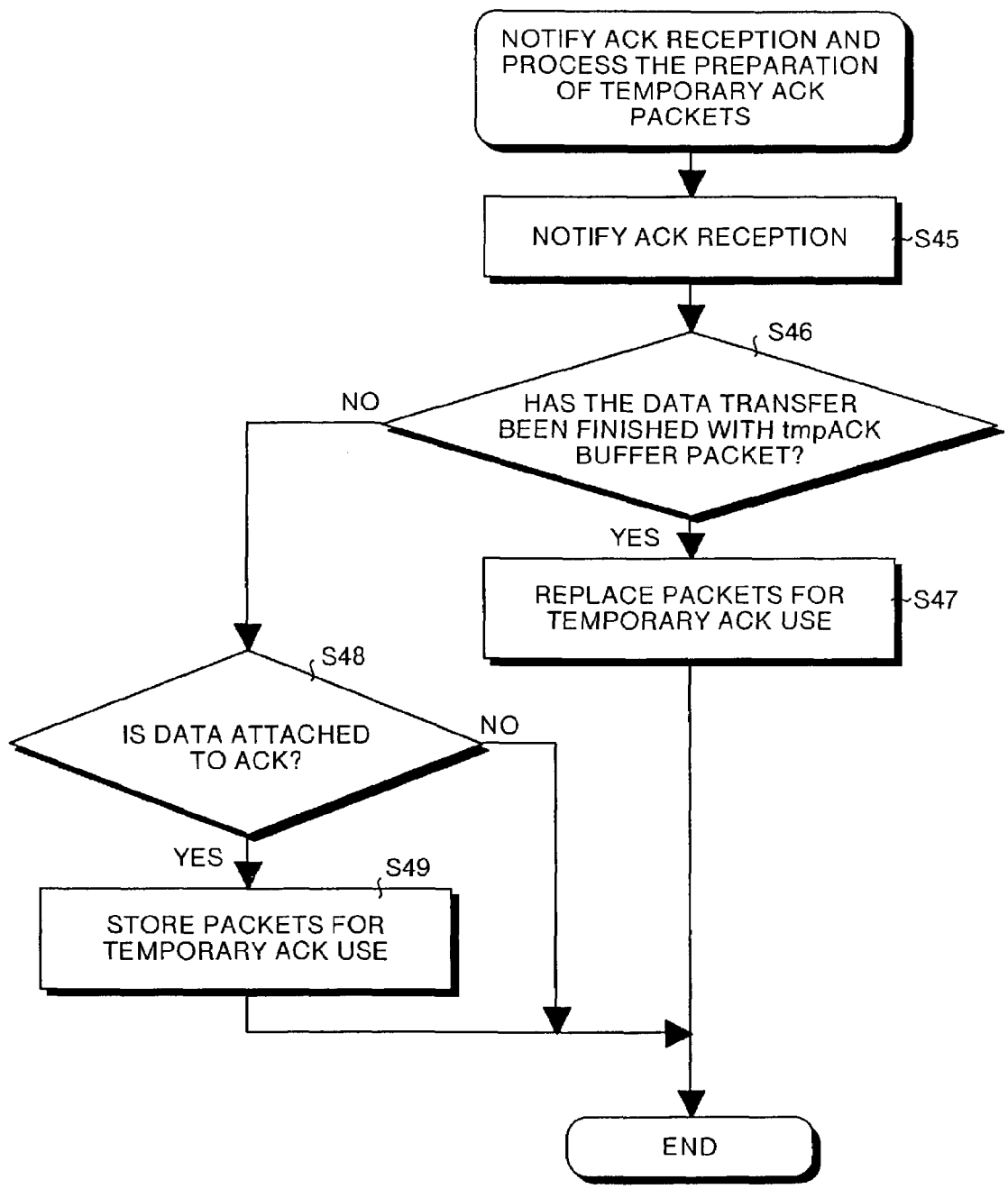
FIG. 6 is a flowchart of ACK reception notice and temporary ACK packet preparation processing procedure corresponding to step S36.

In the case where the packet received is not a communication-end packet (step S104, NO), a further decision is made whether the destination of the packet is dependent on delays (step S105). The decision as to whether the destination is delay-dependent corresponds to steps S25 and S41, in which it is decided whether the RTT between the data distribution management device 10 and the destination (receiving device C2) is longer compared to the retransmission timeout (RTO) of the data transmission point (transmission device C1). When RTT is longer, the destination is judged as delay-dependent. Should the destination be not delay-dependent (step S105, NO), as FIG. 6 shows, an ACK reception notice and temporary ACK-exclusive packets are prepared (step S112) and this processing is terminated. Contrarily, when the destination is delay-dependent (step S105, YES), step S13 or the temporary ACK (tmpACK) use control corresponding to FIG. 7 is processed, the packet received is transferred to the destination (step S107), and this processing is terminated.

Second Embodiment

A second embodiment of this invention is explained below. In the second embodiment, the tmpACK use control processing shown in FIG. 7 is applied to prepare and transmit tmpACK in the procedure of time-based delay ACK.

Figure 15:
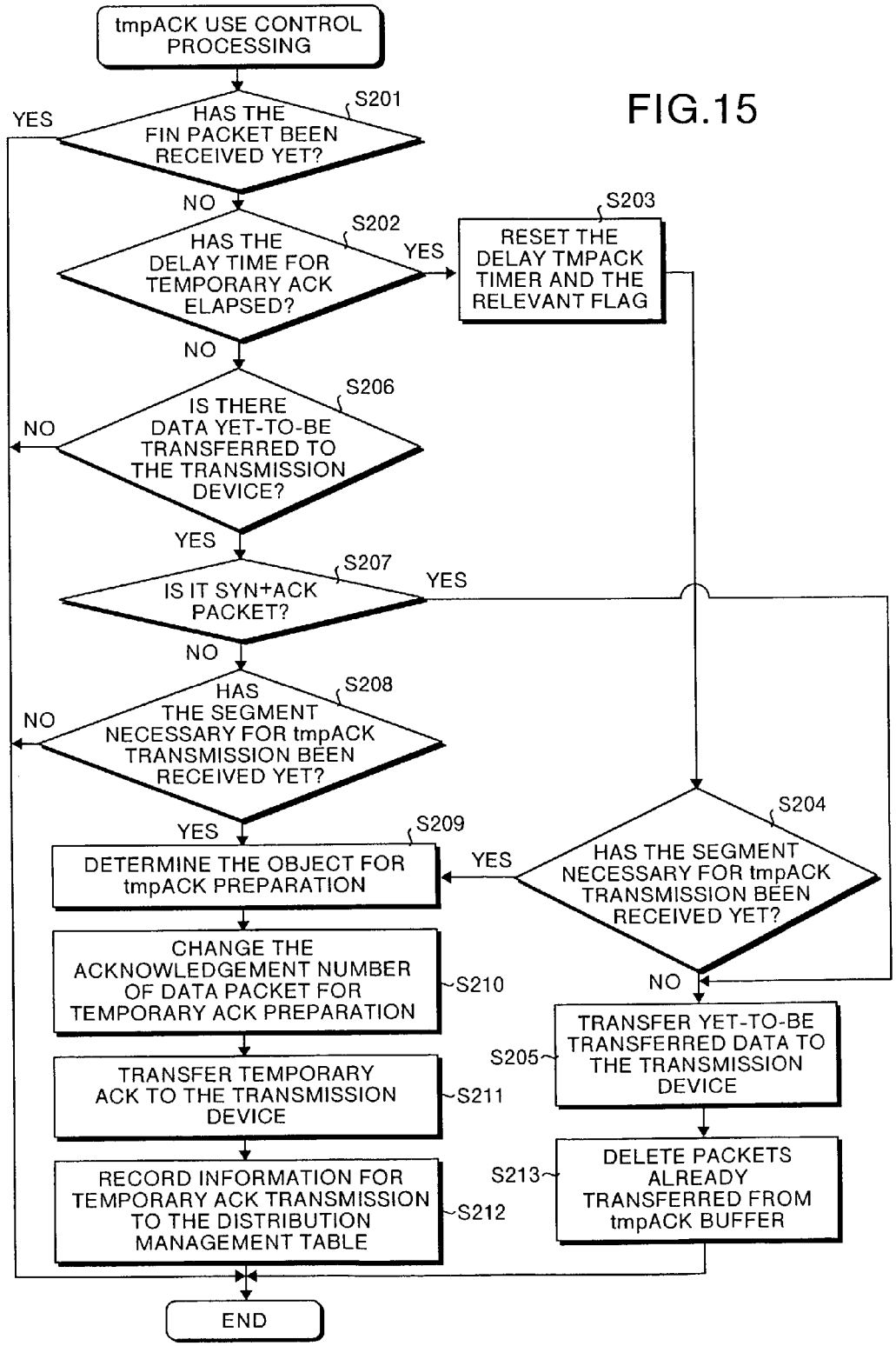
FIG. 15 is a detail flowchart of the procedure in which tmpACK use-control is processed by the data distribution management device according to a second embodiment of this invention.

FIG. 15 is a flowchart showing the tmpACK use processing procedure of the data distribution management device of the second embodiment of this invention. In FIG. 15, the value of the FIN received flag as set by a series of processes shown in FIG. 2 is referred to decide whether the communication-end data packet has been received or otherwise (step S201). When it is decided that the FIN packet has been received (step S201, YES), then and there a return is made to step S13.

When on the other hand it is decided that the FIN packet has not been received (step S201, NO), a decision is then made whether there is a flag standing to show the lapse of delay time for temporary ACK (step S202). When the delay time for temporary ACK is found to have elapsed (step S202, YES), a delay temporary ACK timer and the related flag are reset (step S203), and it is decided whether the data segment necessary for tmpACK transmission has been received yet (step S204).

When in step S202 the delay time for temporary ACK is judged to have not lapsed, it is decided whether there is yet-to-be transferred data corresponding to the transmission device C1 at the delivery gateway SG (step S206) and should there be no piggyback or other type of yet-to-be transferred data (step S206, NO), a return is made to step 13, and should there be yet-to-be transferred data (step S206, YES), a transfer is made to step S207.

In step S207, it is decided whether the data packets stored in the tmpPAK buffer 4 are (SYN+ACK) packets, and should they be found to be (SYN+ACK) packets, yet-to-be transferred (SYN+ACK) packets are transferred to the destination (step S205), subsequent to which those yet-to-be transferred (SYN+ACK) packets are deleted from the tmpACK buffer 4 (step S213) and a return is made to S13. Those yet-to-be transferred packets are what is called piggyback packets.

On the other hand, when in step S207 the tmpACK buffer 4-stored data packets are not (SYN+ACK) packets, it is decided whether the data segments necessary for tmpACK transmission have been received yet (step S208). In the processing in step S204 and in step S208, it is decided whether the data segment necessary for tmpACK transmission has been received by referring to the distribution management table 1 and by using the segments count variables necessary for tmpACK transmission.

When in step S204 it is decided that the data segment necessary for tmpACK transmission has not been received, the yet-to-be transferred ACK packets stored in the tmpACK buffer 4 are transferred to the transmission device C1 (step S205), subsequent to which those yet-to-be transferred ACK packets are deleted from the tmpACK buffer 4 (step S213) and are turn is made to step S13. Those yet-to-be transferred packets are what is called piggyback packets.

On the other hand, when in steps S204 and S208 it is decided that the data segment necessary for tmpACK transmission has been received, the data segment from the transmission device C1 that becomes the object in tmpACK preparation is determined (step S209). In this processing in step S209, the distribution management table 1 is employed to perform processing by referring to the state of reception at the transmission gateway SG, the state of transmission of tmpACK, and the SACK options of TCP protocol between the transmission device C1 and the receiving device C2.

For instance, in the case of communication where the segments count variable necessary for tmpACK transmission stands at "1" and where SACK options are not provided, from among data segments in the entries in the distribution management table 1—the data segments which are capable of tmpACK transmission, which are yet to transmit tmpACK, which are in a state of waiting for ACK reception, which are small in intrinsic sequence number, and which have been received at the transmission gateway SG—a data segment whose sequence number is one before the last sequence number is finally picked as the object to be covered for the preparation and transmission of tmpACK. Further, in the case of communication, for example, where the segments count variable necessary for tmpACK transmission stands at "1" and where SACK options are provided, from among those data segments—which are capable of tmpACK transmission, which are yet to transmit tmpACK, which are in a state of waiting for ACK reception, which are small in intrinsic sequence number, for which serially numbered, yet-to-be received segment groups are not more than four, and which have been received at the transmission gateway SG—a data segment that stands one before the last sequence number is finally picked as the object to be covered for the preparation and transmission of tmpACK.

When the processing in step S209 is ended, a data segment is prepared as tmpACK by rewriting an arrival acknowledgement number of the data segment stored in the tmpACK buffer 4 to a number obtained by adding "1" to the sequence number of the data segment which is the object covered for the preparation of tmpACK decided in step S209. In the case of TCP with SACK options added, a data segment is decided as an object to be covered in the preparation of tmpACK in which SACK options have been considered in step S209, and in step S210 a delivery acknowledgement with SACK options added is prepared.

After the processing in step S210, tmpACK is transmitted to the transmission device C1 (step S211), the information on all data segments entered in the distribution management table 1 in correspondence with the tmpACK transmitted has its setting changed to tmpACK transmitted (step S212) and a return is made to step S13.

Third Embodiment

A third embodiment of this invention is explained below. In the third embodiment, the tmpACK use control processing shown in FIG. 7 is applied to prepare and transmit tmpACK in the procedure of delay ACK based on the number of packets received.

Figure 16:
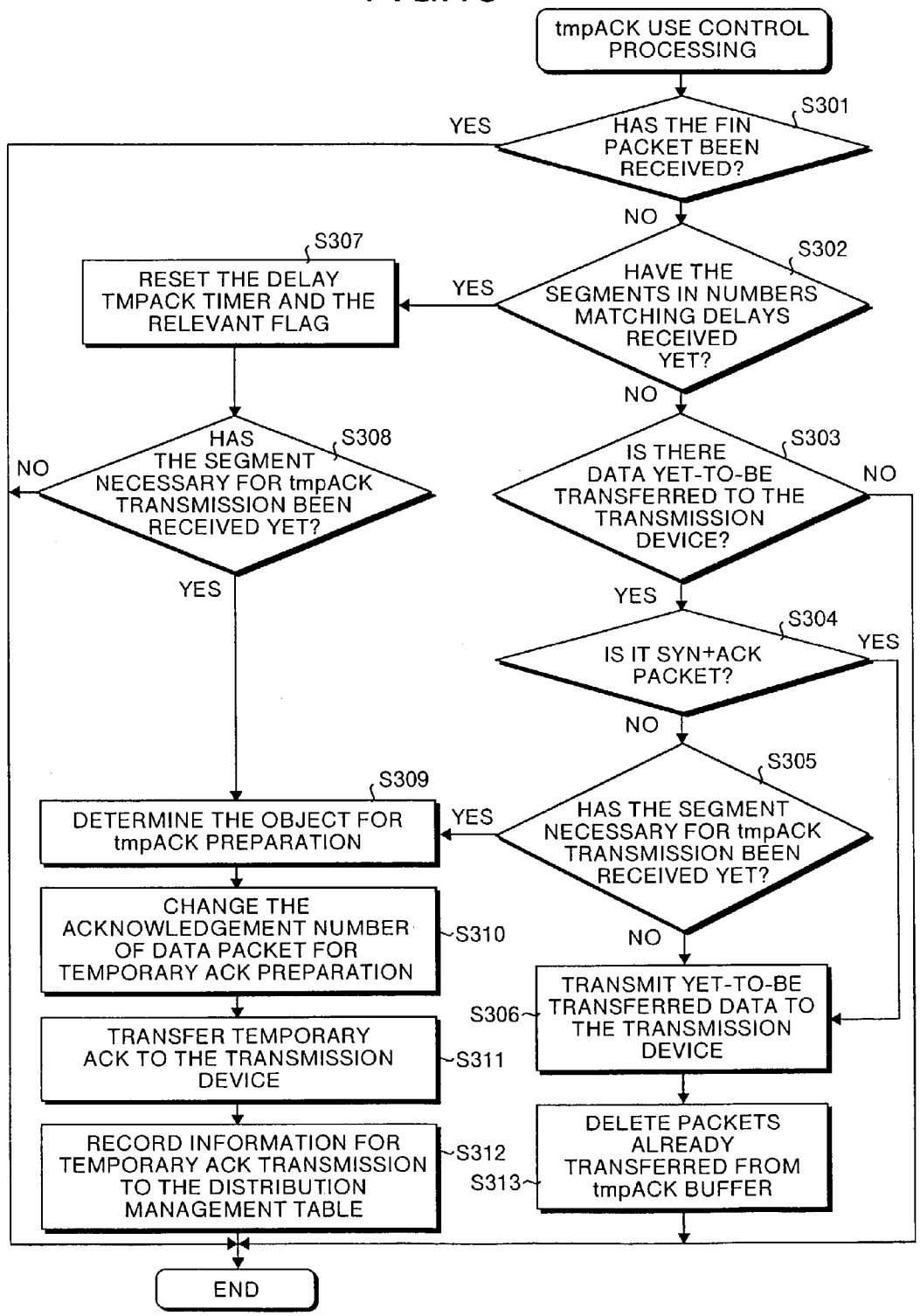
FIG. 16 is a detail flowchart of the procedure in which tmpACK use-control is processed by the data distribution management device according to a third embodiment of this invention.

FIG. 16 is a flowchart showing the tmpACK use processing procedure of the data distribution management device that is the third embodiment of this invention. In FIG. 16, by referring to the value of the FIN received flag as set by a series of processing in FIG. 2, it is decided whether the data packet after communication is ended has been received or otherwise (step S301). When it is decided that FIN packet has been received (step S301, YES), then and there a return is made to step S13.

On the other hand, when it is decided that the FIN packet has not been received (step S301, NO), it is decided whether data segments in numbers matching delays have been received (step S302). When data segments in numbers matching the delays have been received (step S302, YES), the delay temporary ACK timer and the related flag are reset (step S307) and it is decided whether the data segment necessary for the transmission of tmpACK is received (step S308).

When in step S302 it is decided that data segments in numbers matching the delays are not received, it is decided whether there is yet-to-be transferred data corresponding to the transmission device C1 in the transmission gateway SG (step S303). If there is no yet-to-be transferred data (step S303, NO), a return is made to step S13, and if there is yet-to-be transferred data (step S303, YES), a shift is made to step S304.

In step S304, it is decided whether the data packets stored in tmpACK buffer 4 are (SYN+ACK) packets, and should they be found to be (SYN+ACK) packets, yet-to-be transferred (SYN+ACK) packets are transferred to the destination (step S306), subsequent to which these yet-to-be transferred (SYN+ACK) packets are deleted from the tmpACK buffer 4 (step S313) and a return made to S13. These yet-to-be transferred packets are what is called piggyback packets.

On the other hand, when in step S304 the tmpACK buffer 4-stored data packets are not (SYN+ACK) packets, it is decided whether the data segments necessary for tmpACK transmission have been received yet (step S305). In the processing in step S305 and in step S308, by referring to the distribution management table 1 and by using the segments count variables necessary for tmpACK transmission, it is decided whether the data segment necessary for tmpACK transmission has been received.

When in step S305 it is decided that the data segment necessary for tmpACK transmission has not been received, the yet-to-be transferred ACK packets stored in the tmpACK buffer 4 are transferred to the transmission device C1 (step S306), subsequent to which these yet-to-be transferred ACK packets are deleted from the tmpACK buffer 4 (step S313) and a return is made to step S13. These yet-to-be transferred packets are what is called piggyback packets.

On the other hand, when in steps S305 and S308 it is decided that the data segment necessary for tmpACK transmission has been received, the data segment from the transmission device C1 is determined as the object in tmpACK preparation (step S309) In this processing in step S309, the distribution management table 1 is employed to perform processing by referring to the state of reception at the transmission gateway SG, the state of transmission of tmpACK, and the SACK options of TCP protocol between the transmission device C1 and the receiving device C2.

For instance, in the case of communication where the segments count variable necessary for tmpACK transmission stands at "1" and where SACK options are not provided, from among data segments in the entries in the distribution management table 1—the data segments which are capable of tmpACK transmission, which are yet to transmit tmpACK, which are in a state of waiting for ACK reception, which are small in intrinsic sequence number, and which have been received at the transmission gateway SG—a data segment whose sequence number is one before the last sequence number is finally picked as the object to be covered for the preparation and transmission of tmpACK. In addition, in the case of communication, for example, where the segments count variable necessary for tmpACK transmission stands at "1" and where SACK options are provided, from among those data segments—which are capable of tmpACK transmission, which are yet to transmit tmpACK, which are in a state of waiting for ACK reception, which are small in intrinsic sequence number, for which serially numbered, yet-to-be received segment groups are not more than four, and which have been received at the transmission gateway SG—a data segment that stands one before the last sequence number is finally picked as the object to be covered for the preparation and transmission of tmpACK.

When the processing in step S309 is ended, a data segment is prepared as tmpACK by rewriting an arrival acknowledgement number of the data segment stored in the tmpACK buffer 4 to a number obtained by adding "1" to the sequence number of the data segment which is the object covered for the preparation of tmpACK as determined in step S309. In the case of TCP with SACK options added, a data segment is decided as the object to be covered in the preparation of tmpACK in which SACK options have been considered in step S309, and in step S310, a delivery acknowledgement with SACK options added is prepared.

After the processing in step S310, tmpACK is transmitted to the transmission device C1 (step S311), the information on all data segments entered in the distribution management table 1 in correspondence with the tmpACK transmitted has its setting changed to tmpACK transmitted (step S312) and a return is made to step S13.

In the first to third embodiments, a series of processing involving the preparation and transmission of tmpACK as shown in FIGS. 7, 15 and 16 gets started with the reception of data packets, by referring to the tmpACK usable flag, and with the events including tmpACK use control or the readings on the timer or counter that concerns delay temporary ACK.

Similarly to delay ACK procedure in TCP or the like as described above, in delay temporary ACK, a certain period or reception of a certain number of packets is waited before temporary ACK is prepared or transmitted, this being to promote the processing of the transmission gateway SG and the curtailment of flows between the transmission gateway SG and the transmission device C1.

Events that a timer or a counter associated with delay temporary ACK concerns are generated in order to notify the tmpACK preparation section 13 that a timeout of wait time for a delay temporary ACK has occurred in each certain period of time, in cases involving installation using delay temporary ACK as in the second embodiment, for example, based on a method of preparing and transmitting a delay temporary ACK. The tmpACK use-decision section 12 has both a timer and a delay temporary ACK time lapse flag provided, the timer to measure the timing of generating a delay temporary ACK and the flag to set timeout variables or constants and the "ON" "OFF" values based thereon.

As the third embodiment shows, in the case of installation where delay temporary ACK is used in the method of preparing and transmitting a delay temporary ACK after the reception of a certain number of packets is waited, the tmpACK use-decision section 12 has both a counter and a delay temporary ACK flag provided, the counter to measure the number of packets received in every communication and the flag to set variables (or constants) for the number of packets or of bytes necessary for a delay, as well as "ON" "OFF" values based thereon, whereby events are caused to occur every time a certain number of packets or a packet having a certain number of bytes are received.

By the way, concerning the method of creating a temporary ACK, the transmission gateway SG is provided with a flag related to delay temporary ACK preparation and transmission such as one as to whether a delay time is specified, a number of delay packets is specified, or a delay temporary ACK is used, and thereby selection may be made on processings in the first to third embodiments shown in FIG. 7, FIG. 15, and FIG. 16.

In the first to third embodiments described above, the transmission gateway SG is orchestrated to prepare and send temporary delivery acknowledgements only for those communications which define that the transmission gateway SG uses functions of preparing and sending the delivery acknowledgements according to protocol classes or protocol types.

In addition, it is decided whether data segments are validly received in the reception device C2, and the transmission gateway SG is orchestrated to prepare and send the temporary delivery acknowledgements only for the segments which are successfully received in the receiving device C2.

Further, use is made of the function to manage buffers efficiently according to the purposes of their use and with respect to every communication, ACK segments and other information from the receiving device C1 are stored at the transmission gateway SG, and the above-mentioned temporary delivery acknowledgements are prepared using the above stored items, and thereby the data segments including ACK directed from the receiving device C2 to the transmission device C1 are transferred to the transmission device C1 without being abrogated.

Moreover, at the transmission gateway SG, delays are introduced in preparing temporary delivery acknowledgement corresponding to the transmission device C1, and it is thereby possible to reduce processing load on the transmission gateway SG and on the transmission device C1 and curb the congestion between the transmission gateway SG and the transmission device C1.

The result of all this is allowed to perform high-reliability, high-speed communication where protocols and segments not affected by transmission delays or protocols and segments whose efficiency drops with the use of temporary delivery acknowledgement are considered, all data is transferred with reliability without contradictions with acknowledgement at the reception device C2, processing load on the transmission device C1 and transmission gateway SG are reduced, and where the congestion is curved between the transmission gateway SG and the transmission device C1.

Fourth Embodiment

The fourth embodiment of this invention is explained below. In the first to third embodiments described above, the data distribution management device 10 is arranged between the circuit 3 with a large transmission delay and the circuit 2 with a small transmission delay. In the fourth embodiment, the transmission device C1 and receiving device C2 are each made terminal devices with both transmission and receiving functions, and a data distribution management device equivalent to the data distribution management device 10 is provided on the receiving device C2 side, which renders it possible to improve delays in both directions.

Figure 17:
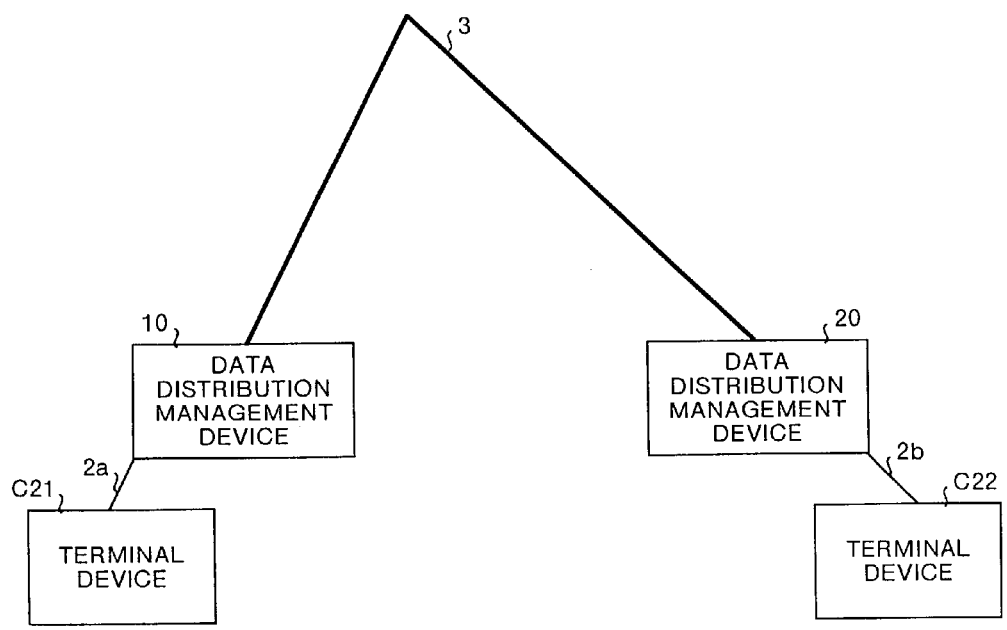
FIG. 17 is a block diagram showing the configuration of a data distribution management system which allows two-way communications by using two data management devices according to a fourth embodiment of this invention.

As FIG. 17 shows, the circuit 3 with a large delay has its both ends mounted with data distribution management devices 10 and 20, respectively. The data distribution management devices 10 and 20 are connected with terminal devices C21 and C22 through circuits 2a and 2b each with a small delay, respectively. The terminal devices C21 and C22 are each furnished with both data transmission function and receiving function. The data distribution management device 10 is the same as the data distribution management device 10 shown in FIG. 1. This device 10 transfers the transmission data sent from the terminal device C21 to the terminal device C22 via the circuit 3 and sends a temporary arrival acknowledgement to the terminal device C21. Similarly to the data distribution management device 10, the data distribution management device 20 transfers the transmission data sent from the terminal device C22 to the terminal device C21 via the circuit 3 and sends temporary arrival acknowledgement to the terminal device C22. However, when they receive data from the circuit 3 with a large delay, the data distribution management devices 10 and 20 perform only the transfer of this data. The data distribution management device 20, for example, when it receives data from the data distribution management device 10, only transfers the data to the terminal device C22 and does not send a temporary arrival acknowledgement. This renders possible communication with an improved bi-directional delay.

Fifth Embodiment

A fifth embodiment of this invention is explained below. Concerning the aforesaid first to fourth embodiments, they are the data distribution management devices provided to address transmission delays as in satellite circuits. The fifth embodiment is devised so that it is applicable to wireless circuits, etc., where peculiar errors such as burst errors occur.

Figure 18:
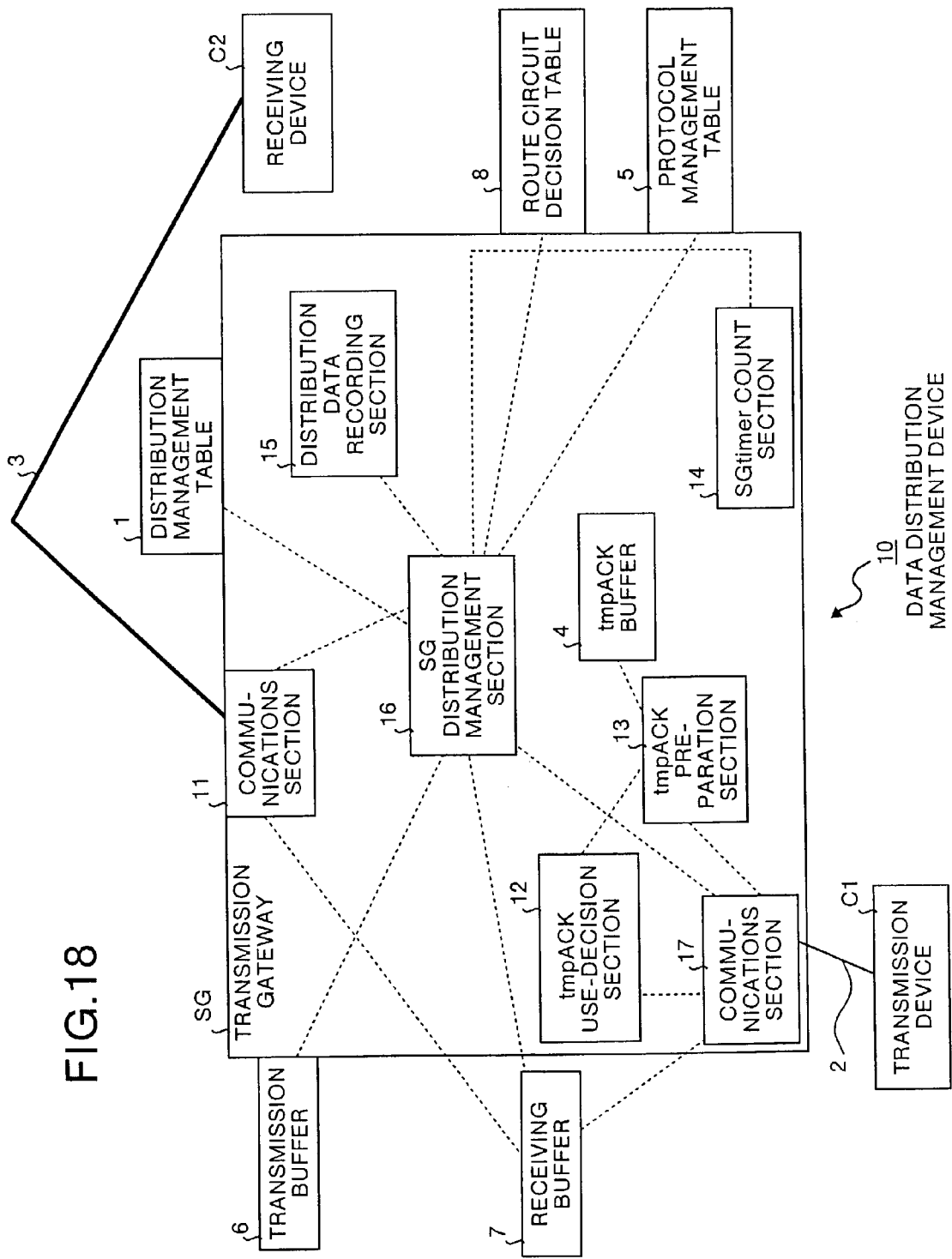
FIG. 18 is a block diagram showing the configuration of a data distribution management system according to a fifth embodiment of this invention.

FIG. 18 is a block diagram showing the configuration of a data distribution management device according to the fifth embodiment of this invention. This data distribution management device is further provided with a route circuit decision table 8, with the SG distribution management section 16 shown in the aforesaid first to fourth embodiments performing the processing shown in FIG. 19. Otherwise, the fifth embodiment is the same as the first to fourth embodiments both in configuration and operation.

Figure 19:
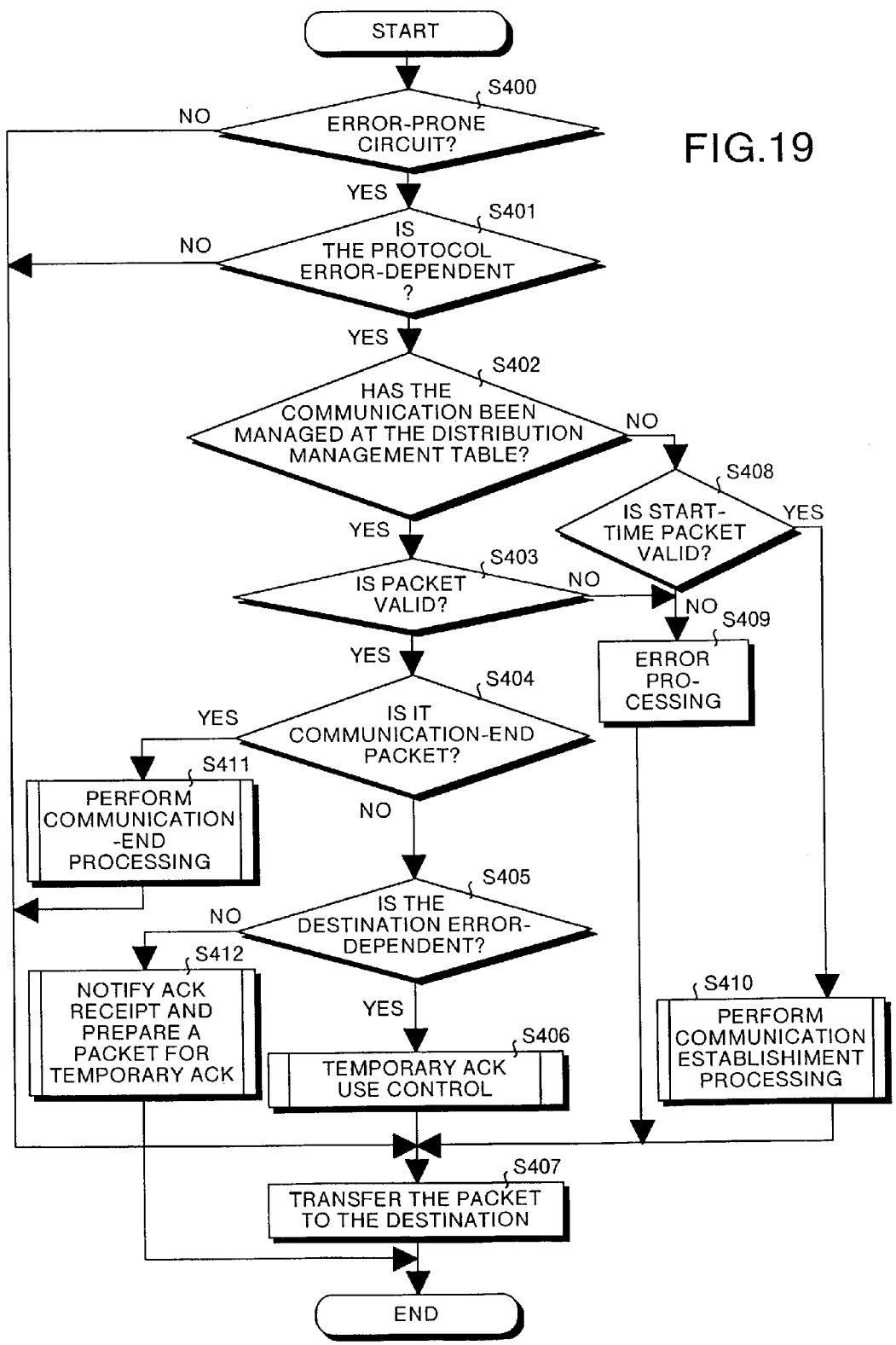
FIG. 19 is a flowchart outlining the general processing of the data distribution management device according to the fifth embodiment of this invention.

FIG. 19 is a flowchart showing the general processing procedure of the data distribution management device, which is the fifth embodiment of this invention. In FIG. 19, first by referring to the route circuit decision table 8, it is decided whether the destination of transfer is via the circuit in which burst errors or other errors are frequent (step S400). As FIG. 20 shows, the route circuit decision table 8 possesses items, such as "destination", "route circuit", and "errors" which indicates the frequency of occurrence of errors, and contains information on the frequency of occurrence of errors relative to the destination to and route circuits through which data is transferred. When referring to the route circuit decision table 8 the SG distribution management section 16 decides that an error-prone circuit is not used (step S400, NO), a packet received is transferred to the destination (step S407) and this processing is terminated. Contrarily, when it is decided that an error-prone circuit is used (step S400, YES), a shift is made to step S401.

Subsequently, it is decided whether, in relation to steps S24 and S25, the protocol of the IP header is an error-dependent protocol, or whether the transmission point port and/or destination port of the TCP header are error-dependent (step S401). For instance, it may also be well to make further detailed decision by using a protocol determination table with one of applications on UDP targeted on spoofing.

Should the protocol of the IP header be not an error-dependent protocol, or should the transmission point port and/or destination port of the TCP header be neither error-dependent (step S401, NO), a processing is performed to transfer the received packet to the destination (step S407) and terminate this processing. Contrarily, should the protocol of the IP header be an error-dependent protocol and should the transmission point port and/or destination port of the TCP header be also error-dependent (step S401, YES), it is decided, corresponding to step S27, whether the received data packet in a communication has been managed at the distribution management table 1 (step S402).

When the received data packet in the communication has not been managed at the distribution management table 1 (step S402, NO), a decision is further made whether the packet is a valid communication-start time packet corresponding to steps S28 and S29 (step S408). Given that the packet is found to be a valid communication-start time packet (step S408, YES), the establishment of communication corresponding to steps S30, S36 and S37 is processed (step S410), on completion of which the packet received is transferred to the destination (step S407) and this processing is terminated. Contrarily, should the packet received be not a valid communication-start time packet (step S408, NO), error processing is performed (step S409). Specifically, in this error processing, when packets are incompletely received at the destination, data is deleted from the distribution management table 1 and from the start-time packet buffer and the process of spoofing is stopped. After that, a transfer is made to step S407, the packet received is transferred to the destination, and this processing is terminated.

On the other hand, when the received data packet in the communication has been managed at the distribution management table 1 (step S402, YES), a decision is then made whether the packet received is a valid packet (step S403). This decision represents a syntax check that TCP makes, including decision processing in steps S21 and S31. Should the decision be that the packet is not valid, (step S403, NO), error processing is performed (step S409), the packet received is transferred to the destination (step S407), and this processing is terminated.

When the packet received is judged to be valid (step S403, YES), a decision is then made whether the packet received is a communication-end packet (step S404). This decision corresponds to the processing of decision in step S32. To specify, this decision is made by the FIN reception flag that turns "ON" at the point in time at which the FIN reception flag of the packet and the initial FIN packet are received. When here the packet received is found to be a communication-end packet (step S404, YES), communication-end processing is performed (step S411), the packet is transferred to the destination (step S407), and this processing is terminated. This communication-end processing is a processing that corresponds to step S40, and in the case of end-related packet, the FIN reception flag turns "ON" at the point in time at which the initial FIN packet is received and packets are transferred to the destination (the transfer being made to proceed to the next processing) in the procedure similar to TCP until it is decided that communication is ended. At the end of the communication, similarly to the time wait processing, information is deleted from the buffers and from the distribution management table 1.

In the case where the packet received is not a communication-end packet (step S404, NO), a further decision is made whether the destination of the packet is dependent on errors (step S405). The decision as to whether the destination is error-dependent corresponds to steps S25 and S41, in which it is decided whether a bit error rate (BER) between the data distribution management device 10 and the destination (receiving device C2) is higher compared to BER of the circuit between the transmission device C1 and the data distribution management device 10. When BER is higher, the destination is judged as error-dependent. Should the destination be not error-dependent (step S405, NO), as FIG. 6 shows, an ACK reception notice and temporary ACK-exclusive packets are prepared (step S412) and this processing is terminated. Contrarily, when the destination is error-dependent (step S405, YES), the processing in step S13 or the temporary ACK (tmpACK) use control corresponding to FIG. 7 is performed, the packet received is transferred to the destination (step S407), and this processing is terminated.

Figure 21:
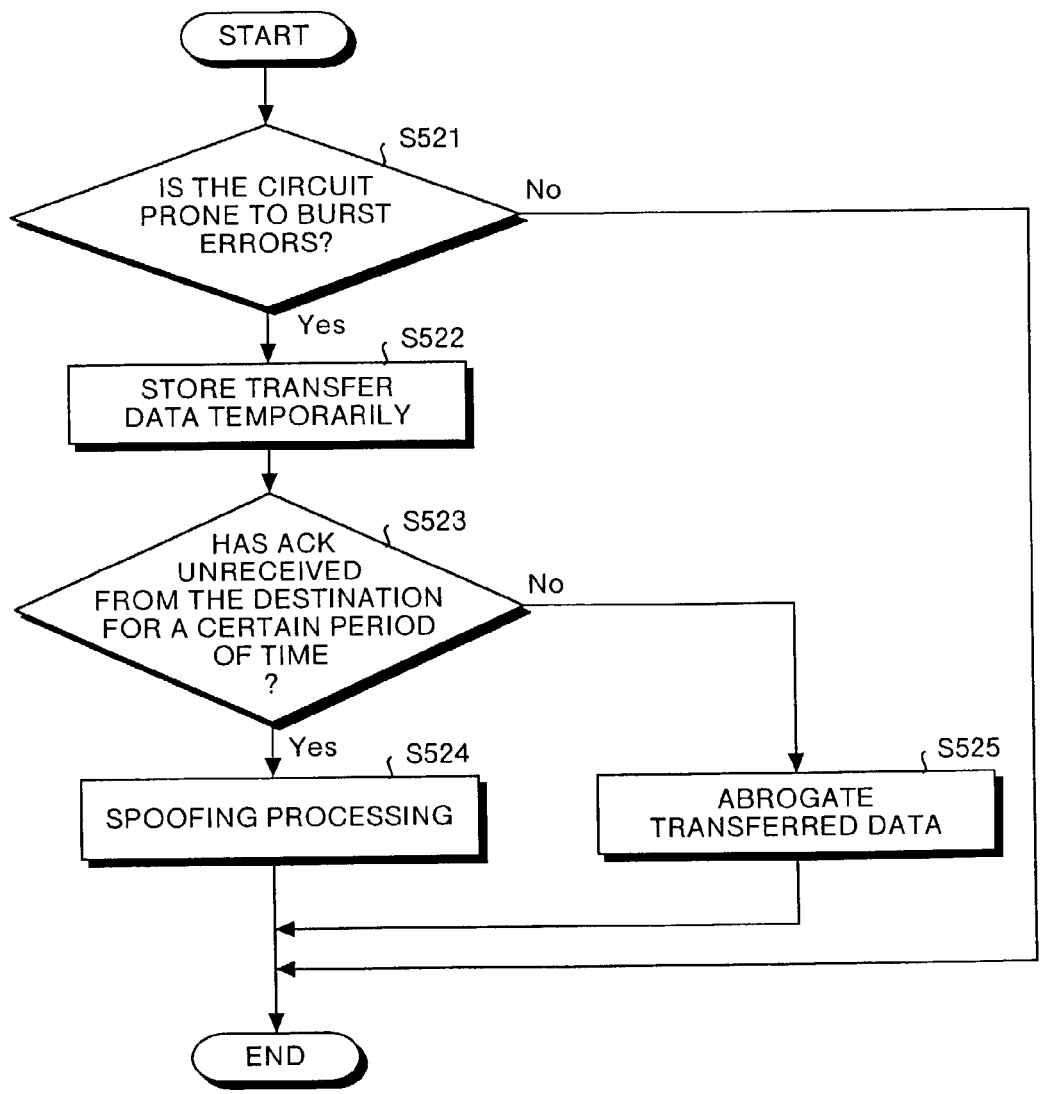
FIG. 21 is a flowchart showing the processing procedure of applying the spoofing processing to burst error-liable circuits.

By the way, the above processing is applicable to wireless circuits or other circuits the throughput of which may fall from errors, such as burst errors. Spoofing does prevent this throughput from dropping. In this case, by conducting the processing shown in FIG. 21, a falloff in throughput following burst errors is prevented, and by carrying out buffer management, spoofing is executed to prevent reduced throughput. As in FIG. 21, the data distribution management device 10 decides whether the circuit used for communication is an error-prone circuit (step S521). The decision is made by referring to the route circuit decision table 8 described above.

When subsequently the circuit is the burst error-prone circuits (step S521, YES), transfer data is temporarily stored (step S522) in preparation for spoofing. After that, it is decided whether ACK has not been received from the destination for a certain period of time (step S523). Should ACK be not being received (step S523, NO), spoofing is resorted (step S525), throughput is prevented from reduction and this processing is terminated. This spoofing corresponds to the above step S13 in which temporary ACK is transferred.

On the other hand, in the case of circuits not prone to burst errors (step S521, NO), or in the case where ACK has been received from the destination for a certain period of time (step S523, YES), this processing is terminated. Incidentally, this processing may well be combined with the spoofing processing for the delay-dependent circuits mentioned above.

By the way, in determining error dependence in step S405, it may also be well to pre-set the destination as error-dependent, or CRC errors of TCP may be dynamically obtained to make a relevant decision. Errors include those resulting from steady-state thermal noises or burst errors, therefore, processing may be performed in accordance with individually peculiar errors. Or in addition to the processing to address error dependence in the above fifth embodiment, it may also be well to use in combination of the processing to address transmission delays shown in the first to fourth embodiments.

As explained above, according to this invention, the decision unit decides whether the data transmitted by the first terminal device is a protocol that depends on transmission delays. The management control unit orchestrates the returning unit to prepare and send the delivery acknowledgement only when the decision unit decides that the data is the protocol that depends on transmission delays, the return processing being prevented from execution, however, when the protocol is unaffected by transmission delays or when the protocol gets deteriorated in efficiency as temporary delivery acknowledgement. Thus, it is advantageously possible to transfer data quickly and positively, reduce the load on the first terminal device and the data distribution management device, and perform high-reliability, high-speed communication.

According to the next invention, the decision unit decides whether the destination of the data transmitted by the first terminal device passes through an error-prone circuit. The management control unit orchestrates the returning unit to prepare and send the delivery acknowledgement when the decision unit decides that the destination passes through an error-prone circuit to prevent throughput from deteriorating from errors. Thus, it is advantageously possible to transfer data quickly and positively, reduce the load on the first terminal device and the data distribution management device, and perform high-reliability, high-speed communication.

According to the next invention, the decision unit further decides whether the data transmitted by the first terminal device is a protocol dependent on errors and having the possibility of reducing the throughput. The management control unit orchestrates the returning unit to prepare and send the delivery acknowledgement and determines the return processing of the delivery acknowledgement for each protocol if and when the decision unit decides that the data transmitted passes through an error-prone circuit and that the data is a protocol dependent on errors and having the possibility to reduce the throughput. Thus, it is advantageously possible to transfer data quickly and positively, reduce the load on the first terminal device and the data distribution management device, and perform high-reliability, high-speed communication.

According to the next invention, the decision unit decides whether the data transmitted is a protocol dependent at least on the transmission delays or whether the data passes through an error-prone circuit. The management control unit orchestrates the returning unit to prepare and send the delivery acknowledgement if and when the decision unit decides that the data delivered is a protocol dependent on the transmission delays or that the data passes through an error-prone circuit, the return processing being geared to avoid the influence solely of transmission delays, the influence solely of errors, or the influence of both the transmission delays and the errors. Thus, it is advantageously possible to transfer data quickly and positively, reduce the load on the first terminal device and the data distribution management device, and perform high-reliability, high-speed communication.

According to the next invention, the communication start decision unit decides whether the data transmitted by the first terminal device is the data relevant to a start of communication. The management control device orchestrated the returning unit not to prepare and send the delivery acknowledgement if and when the communication start decision unit decides that the first terminal-transmitted data is the data relevant to a start of communication. Thus, it is advantageously possible to transfer data quickly and positively, reduce the load on the first terminal device and the data distribution management device, and perform high-reliability, high-speed communication.

According to the next invention, the communication ending decision unit decides whether the data transmitted by the first terminal device is data relevant to an ending of communication. The management control device orchestrates the returning unit not to send the delivery acknowledgement if and when the communication ending decision unit decides that the first terminal-transmitted data is data relevant to the ending of communication. Thus, it is advantageously possible to transfer data quickly and positively, reduce the load on the first terminal device and the data distribution management device, and perform high-reliability, high-speed communication.

According to the next invention, the reception decision unit decides whether the data transmitted by the first terminal device is the data properly acceptable to the second terminal device. The management control device orchestrates the returning unit not to send the delivery acknowledgement if and when the reception decision unit decides that the first terminal-transmitted data is not the data to be properly acceptable to the second terminal device. The management control device also performs the communication which does not contradict with the confirmation of reception at the second terminal device. Thus, it is advantageously possible to transfer data quickly and positively, reduce the load on the first terminal device and the data distribution management device, and perform high-reliability, high-speed communication.

According to the next invention, the information obtaining unit obtains information related to the communication between the first and the second terminal devices from the header information pertaining to the arbitrary data received from the first and the second terminal devices. The information retaining unit retains the communication-related information obtained by the information obtaining unit, and the decision unit, the communication start decision unit and the communication ending decision unit or the reception decision unit each make decisions based on above-mentioned communications-related information to thereby orchestrate the returning unit to prepare and send the delivery acknowledgement, the return processing being not orchestrated, however, in the case of protocols that do not influence the throughput even when transmission delays or transmission errors occur, or in the case involving a protocol where the use of temporary delivery acknowledgement renders the protocol less efficient. Thus, it is advantageously possible to transfer data quickly and positively, reduce the load on the first terminal device and the data distribution management device, and perform high-reliability, high-speed communication.

According to the next invention, at least one data buffer retains the data received from the first and the second terminal devices at the establishment of communications. The management control unit executes and manages the return processing of delivery acknowledgement after the establishment of communications based on the contents of data stored in segments of the data buffer and in the data buffer. Thus, it is advantageously possible to perform efficient management of communications and perform high-reliability, high-speed communication.

According to the next invention, the data buffer is laid out in a plurality at each of the connections between the first and the second terminal devices and communications are managed in units of connection. Thus, it is advantageously possible to perform efficient management of communications and perform high-reliability, high-speed communication.

According to the next invention, the management table is devised so as to manage at least one data buffer with respect to every connection. Thus, it is advantageously possible to perform efficient management of communications and perform high-reliability, high-speed communication.

According to the next invention, the data buffer is provided in a plurality for every protocol and communications are managed according to classes of protocols. Thus, it is advantageously possible to perform efficient management of communications and perform high-reliability, high-speed communication.

According to the next invention, at least one data buffer is managed by the management table in accordance with the classes of protocols. Thus, it is advantageously possible to perform efficient management of communications and perform high-reliability, high-speed communication.

According to the next invention, the result retention unit receives the delivery acknowledgement transmitted from the second terminal device and retain the result of the delivery acknowledgement. Thus, it is advantageously possible to perform efficient management of communications and perform high-reliability, high-speed communication.

According to the next invention, the data inclusion decision unit decides whether the delivery acknowledgement received from the second terminal device includes in it the data corresponding to the first terminal device. The management control unit abrogates the delivery acknowledgement retained in the result retention unit if and when the data inclusion decision unit decides that the data corresponding to the first terminal device is not included in the delivery acknowledgement. Thus, it is advantageously possible to efficiently and flexibly prepare and transmit delivery acknowledgement, and perform high-reliability, high-speed communication.

According to the next invention, the management unit manages the information pertaining to the communications between the first and the second terminal devices, the buffer retains the data transferred from the first terminal device to the second terminal device, the timer measures the time it takes for the delivery acknowledgement to reach from the second terminal device, and the retransmission control unit, in the event of a data segment or segments of the delivery acknowledgement failing to be received from the second terminal, fetches these data segments from the buffer and retransmits them to the second terminal device. Thus, it is advantageously possible to perform positive retransmission control and perform high-reliability, high-speed communication.

According to the next invention, the decision unit decides whether the returning process of preparing and sending delivery acknowledgement be performed with respect to these data segments based on the contents of the data segments received. The return processing execution unit orchestrates the returning unit to execute the return processing that the decision unit decides. Thus, it is advantageously possible to perform efficient management control of the data and perform high-reliability, high-speed communication.

According to the next invention, the decision information retaining unit retains the decision information on whether the return processing of the delivery acknowledgement decided by the decision unit should be performed. Thus, it is advantageously possible to perform efficient management control of the data and perform high-reliability, high-speed communication.

According to the next invention, when the delivery acknowledgement has been transmitted to the first terminal device, a returned information retaining unit retains the information indicating that the delivery acknowledgement has been sent as a flag, for instance. Thus, it is advantageously possible to perform efficient management control and perform high-reliability, high-speed communication.

According to the next invention, when the return processing is performed, the control data of data transmitted from the first terminal device, the second terminal device, or both the first and the second terminal devices, is used to prepare the delivery acknowledgement. Thus, it is advantageously possible to perform high-reliability, high-speed communication.

According to the next invention, the storage unit stores the control data of data transmitted from the first terminal device, the second terminal device, or both the first and second terminal devices, and the control data so stored is use when preparing the delivery acknowledgement. Thus, it is advantageously possible to prepare efficiently a delivery acknowledgement and perform high-reliability, high-speed communication.

According to the next invention, the acquisition unit acquires data for use in the preparation of the delivery acknowledgement from the control data of data transmitted from the first terminal device, the second terminal device, or both the first and the second terminal devices, and the data so acquired is used for preparation of the delivery acknowledgement. Thus, it is advantageously possible to prepare efficiently a delivery acknowledgement can be prepared and high-reliability, high-speed communication is realized.

According to the next invention, the retention unit retains the control data that the acquisition unit has acquired and the control data thus retained in the retention unit is used for the preparation of the delivery acknowledgement. Thus, it is advantageously possible to prepare efficiently a delivery acknowledgement and perform high-reliability, high-speed communication.

According to the next invention, the delivery acknowledgement once used is recycled in the making of subsequent delivery acknowledgement. Thus, it is advantageously possible to prepare efficiently a delivery acknowledgement and perform high-reliability, high-speed communication.

According to the next invention, when the delivery acknowledgement is prepared, the information combination unit includes in the data sent from the second terminal device to the first second terminal device the delivery acknowledgement, corresponding to the data, sent to the first terminal device from the second and transmits the data so combined by the information combination unit to the first terminal device, thereby rendering it possible for the data transferred from the first terminal device to be transmitted positively to the second terminal device in a piggyback fashion, for instance. Thus, it is advantageously possible to perform high-reliability, high-speed communication.

According to the next invention, the segments count decision unit contains a prescribed number of yet-to-be-received, if not final, data segments which must be counted to prepare yet-to-be-received delivery acknowledgements at the second terminal device and further decides whether there exist the prescribed number of yet-to-be-received data segments. The management control unit orchestrates the returning unit to prepare a delivery acknowledgement and send the delivery acknowledgement to the first terminal device if and when the segments count decision unit decides that the yet-to-be-received data segments exist. Thus, it is advantageously possible to efficiently and flexibly prepare and transmit a delivery acknowledgement and perform high-reliability, high-speed communication.

According to the next invention, the object segment decision unit possesses time variables concerning the timing of transmission of a delivery acknowledgement and decides segments as objects of the delivery acknowledgement which is to be prepared with every lapse of the time that the time variables indicate. The management control unit orchestrates the returning unit to prepare the delivery acknowledgement corresponding to the state of reception of the segments decided by the object segment decision unit as the objects for the preparation of delivery acknowledgement and to send the delivery acknowledgement to the first terminal device. Thus, it is advantageously possible to efficiently and flexibly prepare and transmit a delivery acknowledgement and perform high-reliability, high-speed communication.

According to the next invention, the object segment decision unit possesses reception segment number variables concerning the timing of transmission of a delivery acknowledgement and decides segments as objects of the delivery acknowledgement which is to be prepared at every reception of the segments count that the reception segment number variables indicate. The management control unit orchestrates the returning unit to prepare the delivery acknowledgement corresponding to the state of reception of the segments decided by the object segment decision unit as the objects for the preparation of delivery acknowledgement and to send the delivery acknowledgement to the first terminal device. Thus, it is advantageously possible to efficiently and flexibly prepare and transmit a delivery acknowledgement and perform high-reliability, high-speed communication.

According to the next invention, the management control unit performs data transfer processing relative to the data received from the transmission route the amount of whose transmission delays is larger than has been preset and performs—relative to the data received from the transmission route the amount of whose transmission delays is smaller than has been preset—both the transfer processing of the data and the return processing in which a delivery acknowledgement corresponding to the transferred data is prepared and sent by the returning unit. Thus, it is advantageously possible to perform high-reliability, high-speed communication even when bi-directional communications are perform through the transmission route whose transmission delay is large by installing two data distribution management devices on both the first terminal device and the second terminal device sides.

According to the next invention, when the delay in transmission with the first terminal device is smaller than the delay in transmission with the second terminal device, it is devised such that the contradiction involving communications between transmission and reception is resolved and the data transmission from the first terminal device to the second is made at a fast speed and accurately. Thus, it is advantageously possible to specifically apply the data distribution to satellite circuits, etc., with a large transmission delay.

According to the next invention, at the decision step, it is decided whether the data transmitted by the first terminal device is a protocol that depends on a delay in transmission, and at the management control step, when it is decided at the decision step that the data transmitted by the first terminal device is a protocol dependent on the transmission delay, the returning unit is orchestrated to prepare and send the delivery acknowledgement. Thus, it is advantageously possible to transfer data quickly and positively, reduce the load on the first terminal device and the data distribution management device, and perform high-reliability, high-speed communication.

According to the next invention, at the decision step, it is decided whether the destination of the data transferred from the first terminal device passes through an error-prone circuit, and at the management control step, when it is decided at the decision step that the destination passes through the error-prone circuit, the returning unit is orchestrated to prepare the delivery acknowledgement and send the delivery acknowledgement to the first terminal device, and thereby preventing the throughput from falling off due to errors. Thus, it is advantageously possible to transfer data quickly and positively, reduce the load on the first terminal device and the data distribution management device, and perform high-reliability, high-speed communication.

According to the next invention, at the decision step, it is further decided whether the data transmitted by the first terminal device is a protocol which depending on an error has a possibility of reducing the throughput, and at the management control step, when it is decided at the decision unit that the data distributed passes through an error-prone circuit and that the data is a protocol which depending on an error has the possibility of reducing the throughput, the returning unit is orchestrated to prepare the delivery acknowledgement and send the delivery acknowledgement to the first terminal device, thus the decision on the return processing being made on a protocol by protocol basis. Thus, it is advantageously possible to transfer data quickly and positively, reduce the load on the first terminal device and the data distribution management device, and perform high-reliability, high-speed communication.

According to the next invention, at the decision step, it is decided whether the data transmitted by the first terminal device is a protocol dependent at least on the transmission delay or whether the data passes through an error-prone circuit, and at the management control step, when it is decided at the decision step that the data distributed is a protocol dependent on the transmission delay or that the data passes through an error-prone circuit, the returning unit is orchestrated to prepare the delivery acknowledgement and send the delivery acknowledgement to the first terminal device to avoid the influence of the transmission delay alone, the influence of errors alone, or the influence of both the transmission delay and the errors. Thus, it is advantageously possible to transfer data quickly and positively, reduce the load on the first terminal device and the data distribution management device, and perform high-reliability, high-speed communication.

According to the next invention, at the communication start decision step, it is decided whether the data transmitted by the first terminal device is the data relevant to a start of the communication. At the management control step, if and when it is decided at the communication start decision step that the data so transmitted is the data relevant to the start of the communication, a control is provided not to execute the returning step. Thus, it is advantageously possible to transfer data quickly and positively, reduce the load on the first terminal device and the data distribution management device, and perform high-reliability, high-speed communication.

According to this invention, at the communication ending decision step, it is decided whether the data transmitted by the first terminal device is the data relevant to an ending of the communication. At the management control step, if and when the it is decided at the communication ending decision step that the data so transmitted is the data relevant to the ending of the communication, a control is provided not to execute the returning step. Thus, it is advantageously possible to transfer data quickly and positively, reduce the load on the first terminal device and the data distribution management device, and perform high-reliability, high-speed communication.

According to this invention, at the reception decision step, it is decided whether the data transmitted by the first terminal device is the data that is validly acceptable to the second terminal device. At the management control step, when it is decided at the reception decision step that the data transmitted by the first terminal device is the data that is not validly acceptable to the second terminal device, a control is provided not to execute the returning step. Thus, it is advantageously possible to transfer data quickly and positively, reduce the load on the first terminal device and the data distribution management device, and perform high-reliability, high-speed communication.

INDUSTRIAL APPLICABILITY

As explained above, the data distribution management device and the data distribution management process that this invention concerns are together arranged on the transmission route between the transmission device that requires a delivery acknowledgement to the data transmitted and the receiving device that constitutes the other party in the bilateral communication. For the data distribution management device, the transmission delay between it and the transmission device is small compared with the transmission delay between it and the receiving device and, as such, the data distribution management device is suited to perform both transfer processing in which at least data from the transmission device is transferred to the receiving device and the returning process where a delivery acknowledgement corresponding to the data transferred is prepared and sent in return.

The invention claimed is:
1. A data distribution management device provided on a transmission route between first and second terminal devices, the first terminal device performing communication with the second terminal device, the data distribution management device comprising:
  a transfer unit that controls transfer data from the first terminal device to the second terminal device;
  a returning unit which prepares a delivery acknowledgement corresponding to the data transferred from the first terminal device and sends the delivery acknowledgement to the first terminal device;
  a decision unit that makes a decision whether the destination of the data transferred from the first terminal device passes through an error-prone circuit; and
  a management control unit that controls the returning unit to send the delivery acknowledgement to the first terminal device and controls the transfer unit to transfer the data to the second terminal device when the decision results in that the destination passes through the error-prone circuit, wherein the management control unit determines the error-prone circuit based on whether a bit error rate between the data distribution management device and the second terminal device is higher than a bit error rate of the circuit between the first terminal device and the data distribution management device.

2. The data distribution management device according to claim 1, wherein the decision unit further decides whether the data that the first terminal device transmits is a protocol dependent on errors and having the possibility of reducing the throughput, and the management control unit orchestrates the returning unit to send the delivery acknowledgement to the first terminal device, if and when the decision unit decides that the data distributed passes through an error-prone circuit and that the data is a protocol dependent on errors and having the possibility to reduce the throughput.

3. The data distribution management device according to claim 2, wherein the management control unit performs data transfer processing relative to the data received from the transmission route the amount of whose transmission delays is larger than has been preset and performs, relative to the data received from the transmission route the amount of whose transmission delays is smaller than has been preset, both the transfer processing of the data and the return processing in which a delivery acknowledgement corresponding to the transferred data is prepared and sent by the returning unit.

4. The data distribution management device according to claim 2, wherein a delay in transmission corresponding to the first terminal device is smaller than a delay in transmission corresponding to the second terminal device.

5. The data distribution management device according to claim 1, wherein the decision unit at least decides whether the data transmitted by the first terminal device is a protocol dependent on errors or whether the data passes through an error-prone circuit, and the management control unit orchestrates the returning unit to send the delivery acknowledgement to the first terminal device if and when the decision unit decides that the data distributed is a protocol dependent on the transmission delays or that the data passes through an error-prone circuit.

6. The data distribution management device according to claim 5, wherein the management control unit performs data transfer processing relative to the data received from the transmission route the amount of whose transmission delays is larger than has been preset and performs, relative to the data received from the transmission route the amount of whose transmission delays is smaller than has been preset, both the transfer processing of the data and the return processing in which a delivery acknowledgement corresponding to the transferred data is prepared and sent by the returning unit.

7. The data distribution management device according to claim 5, wherein a delay in transmission corresponding to the first terminal device is smaller than a delay in transmission corresponding to the second terminal device.

8. The data distribution management device according to claim 1, further comprising a communication start decision unit that decides whether the data transmitted by the first terminal device is the data that pertains to the start of communication, wherein the management control unit orchestrates the returning unit not to send the delivery acknowledgement to the first terminal device if and when the communication start decision unit decides that the data transmitted by the first terminal device is the data that pertains to the start of communication.

9. The data distribution management device according to claim 8, further comprising an object segment decision unit that possesses time variables concerning the timing of transmission of a delivery acknowledgement and that decides segments as objects of the delivery acknowledgement which is to be prepared with every time lapse that the time variables indicate, wherein the management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

10. The data distribution management device according to claim 8, further comprising an object segment decision unit that possesses reception segment number variables concerning the timing of transmission of a delivery acknowledgement and that decides segments as objects of the delivery acknowledgement which is to be prepared at every reception of the number of segments that the reception segment number variables indicate, wherein the management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

11. The data distribution management device according to claim 8, wherein the management control unit performs data transfer processing relative to the data received from the transmission route the amount of whose transmission delays is larger than has been preset and performs, relative to the data received from the transmission route the amount of whose transmission delays is smaller than has been preset, both the transfer processing of the data and the return processing in which a delivery acknowledgement corresponding to the transferred data is prepared and sent by the returning unit.

12. The data distribution management device according to claim 8, wherein a delay in transmission corresponding to the first terminal device is smaller than a delay in transmission corresponding to the second terminal device.

13. The data distribution management device according to claim 1, further comprising a communication ending decision unit that decides whether the data transmitted by the first terminal device is the data that concerns the end of communication, wherein the management control unit orchestrates the returning unit not to send the delivery acknowledgement to the first terminal device if and when the communication ending decision unit decides that the data transmitted by the first terminal device is the data that pertains to the end of communication.

14. The data distribution management device according to claim 13, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein the management control unit orchestrates the returning unit to prepare a delivery acknowledgement and send the delivery acknowledgement to the first terminal device if and when the segments count decision unit decides that the yet-to-be-received data segments exist.

15. The data distribution management device according to claim 1, further comprising a reception decision unit that decides whether the data transmitted by the first terminal device is validly acceptable to the second terminal device, wherein the management control unit orchestrates the returning unit not to send the delivery acknowledgement to the first terminal device if and when the reception decision unit decides that the data transmitted by the first terminal device is not validly acceptable to the second terminal device.

16. The data distribution management device according to claim 15, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein the management control unit orchestrates the returning unit to prepare a delivery acknowledgement and send the delivery acknowledgement to the first terminal device if and when the segments count decision unit decides that the yet-to-be-received data segments exist.

17. The data distribution management device according to claim 15, further comprising an object segment decision unit that possesses time variables concerning the timing of transmission of a delivery acknowledgement and that decides segments as objects of the delivery acknowledgement which is to be prepared with every time lapse that the time variables indicate, wherein the management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

18. The data distribution management device according to claim 15, further comprising an object segment decision unit that possesses reception segment number variables concerning the timing of transmission of a delivery acknowledgement and that decides segments as objects of the delivery acknowledgement which is to be prepared at every reception of the number of segments that the reception segment number variables indicate, wherein the management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

19. The data distribution management device according to claim 1, further comprising:

an information obtaining unit that obtains information pertaining to communication between the first and the second terminal devices from header information regarding the data received from the first and the second terminal devices; and an information retaining unit that retains the communication-related information obtained by the information obtaining unit, wherein when making a decision, the decision unit, the communication start decision unit, the communication ending decision unit or the reception decision unit make the decision based on the communications-related information.

20. The data distribution management device according to claim 19, further comprising a result retention unit that receives and retains the delivery acknowledgement sent from the second terminal device.

21. The data distribution management device according to claim 20, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein the management control unit orchestrates the returning unit to prepare a delivery acknowledgement and send the delivery acknowledgement to the first terminal device if and when the segments count decision unit decides that the yet-to-be-received data segments exist.

22. The data distribution management device according to claim 19, further comprising:

a management unit that manages the information pertaining to the communications between the first and the second terminal devices;

a buffer that retains the data transferred from the first terminal device to the second terminal device;

a timer that measures the time it takes for the delivery acknowledgement to reach from the second terminal device; and a retransmission control unit which in the event of a data segment or segments of the delivery acknowledgement failing to be received from the second terminal, fetches these data segments from the buffer and retransmits them to the second terminal device based on the information pertaining to the communication managed by the management unit and the time for the delivery acknowledgement measured by the timer.

23. The data distribution management device according to claim 19, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein the management control unit orchestrates the returning unit to prepare a delivery acknowledgement and send the delivery acknowledgement to the first terminal device if and when the segments count decision unit decides that the yet-to-be-received data segments exist.

24. The data distribution management device according to claim 19, further comprising an object segment decision unit that possesses time variables concerning the timing of transmission of a delivery acknowledgement and that decides segments as objects of the delivery acknowledgement which is to be prepared with every time lapse that the time variables indicate, wherein the management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

25. The data distribution management device according to claim 19, further comprising an object segment decision unit that possesses reception segment number variables concerning the timing of transmission of a delivery acknowledgement and that decides segments as objects of the delivery acknowledgement which is to be prepared at every reception of the number of segments that the reception segment number variables indicate, wherein the management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

26. The data distribution management device according to claim 1, further comprising at least one data buffer that retains the data received from the first and the second terminal devices at the establishment of communication, wherein, subsequent to the establishment of communication, wherein
the management control unit orchestrates the returning unit to send the delivery acknowledgement to the first terminal device based on the contents of data stored in the data buffer segments and the data buffer.

27. The data distribution management device according to claim 26, wherein the data buffer is laid out in a plurality at each of the connections between the first and the second terminal devices.

28. The data distribution management device according to claim 27, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein
the management control unit orchestrates the returning unit to prepare a delivery acknowledgement and send the delivery acknowledgement to the first terminal device if and when the segments count decision unit decides that the yet-to-be-received data segments exist.

29. The data distribution management device according to claim 26, further comprising a management table that manages the data buffer for every connection.

30. The data distribution management device according to claim 29, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein
the management control unit orchestrates the returning unit to prepare a delivery acknowledgement and send the delivery acknowledgement to the first terminal device if and when the segments count decision unit decides that the yet-to-be-received data segments exist.

31. The data distribution management device according to claim 26, wherein the data buffer is provided for every protocol.

32. The data distribution management device according to claim 31, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein
the management control unit orchestrates the returning unit to prepare a delivery acknowledgement and send the delivery acknowledgement to the first terminal device if and when the segments count decision unit decides that the yet-to-be-received data segments exist.

33. The data distribution management device according to claim 26, further comprising a management table that manages the data buffer for every protocol.

34. The data distribution management device according to claim 33, further comprising a data inclusion decision unit that decides whether the delivery acknowledgement received from the second terminal device includes in it the data corresponding to the first terminal device, wherein
the management control unit abrogates the delivery acknowledgement retained in the result retention unit if and when the data inclusion decision unit decides that the data corresponding to the first terminal device is not included in the delivery acknowledgement.

35. The data distribution management device according to claim 33, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein
the management control unit orchestrates the returning unit to prepare a delivery acknowledgement and send the delivery acknowledgement to the first terminal device if and when the segments count decision unit decides that the yet-to-be-received data segments exist.

36. The data distribution management device according to claim 26, further comprising a segments count decision unit that possesses a prescribed number of yet-to-be-received, if not final, data segments which must be counted to prepare yet-to-be-received delivery acknowledgements at the second terminal device and that decides whether the prescribed number of yet-to-be-received data segments exists, wherein
the management control unit orchestrates the returning unit to prepare a delivery acknowledgement and send the delivery acknowledgement to the first terminal device if and when the segments count decision unit decides that the yet-to-be-received data segments exist.

37. The data distribution management device according to claim 26, further comprising an object segment decision unit that possesses time variables concerning the timing of transmission of a delivery acknowledgement and that decides segments as objects of the delivery acknowledgement which is to be prepared with every time lapse that the time variables indicate, wherein
the management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

38. The data distribution management device according to claim 26, further comprising an object segment decision unit that possesses reception segment number variables concerning the timing of transmission of a delivery acknowledgement and that decides segments as objects of the delivery acknowledgement which is to be prepared at every reception of the number of segments that the reception segment number variables indicate, wherein
the management control unit orchestrates the returning unit to prepare the delivery acknowledgement corresponding to the state of reception of the segments decided by the object segment decision unit as the objects for the preparation of delivery acknowledgement and send the delivery acknowledgement to the first terminal device.

39. The data distribution management device according to claim 1, wherein the management control unit performs data transfer processing relative to the data received from the transmission route the amount of whose transmission delays is larger than has been preset and performs, relative to the data received from the transmission route the amount of whose transmission delays is smaller than has been preset, both the transfer processing of the data and the return processing in which a delivery acknowledgement corresponding to the transferred data is prepared and sent by the returning unit.

40. The data distribution management device according to claim 1, wherein a delay in transmission corresponding to the first terminal device is smaller than a delay in transmission corresponding to the second terminal device.

41. A data distribution management method employed by a data distribution management device on a transmission route between first and second terminal devices, the first terminal device performing communication with the second terminal device, the data distribution management method comprising:

a transfer step of controlling transfer of data from the first terminal device to the second terminal device;

a returning step of preparing a delivery acknowledgement corresponding to the data transferred from the first terminal device and sending the delivery acknowledgement to the first terminal device;

a decision step of making a decision whether the destination of the data transferred from the first terminal device passes through an error-prone circuit; and a management control step of, when the decision results in that the destination passes through the error-prone circuit, providing a control to execute the returning step and to transfer the data to the second terminal device, wherein the management control step includes determining the error-prone circuit based on whether a bit error rate between the data distribution management device and the second terminal device is higher than a bit error rate of the circuit between the first terminal device and the data distribution management device.

42. The data distribution management method according to claim 41, wherein it is further decided at the decision step whether the data transmitted by the first terminal device is a protocol which depending on an error has a possibility of reducing the throughput, and at the management control step, if and when it is decided at the decision step that the data passes through an error-prone circuit and that the data is a protocol which depending on an error has a possibility of reducing the throughput, a control is provided to execute the returning step.

43. The data distribution management method according to claim 41, wherein it is further decided at the decision step at least whether the data transmitted by the first terminal device is a protocol that depends on a transmission delay or whether the data passes through an error-prone circuit, and at the management control step, if and when it is decided at the decision step that the data is a protocol that depends on the transmission delay or that the data passes through an error-prone circuit, a control is provided to execute the returning step.

44. The data distribution management method according to claim 41, further comprising a communication start decision step of deciding whether the data transmitted by the first terminal device is the data relevant to a start of the communication, wherein at the management control step, if and when it is decided at the communication start decision step that the data is the data relevant to the start of the communication, a control is provided not to execute the returning step.

45. The data distribution management method according to claim 41, further comprising a communication ending decision step of deciding whether the data transmitted by the first terminal device is the data relevant to an ending of communication, wherein at the management control step, if and when it is decided at the communication ending decision step that the data transmitted is the data relevant to an ending of the communication, a control is provided not to execute the returning step.

46. The data distribution management method according to claim 41, further comprising a reception decision step of deciding whether the data transmitted by the first terminal device is the data that is validly acceptable to the second terminal device, wherein at the management control step, if and when it is decided at the reception decision step that the data the first terminal device has transmitted is not validly acceptable to the second terminal device, a control is provided not to execute the returning step.

* * * * *

UNITED STATES PATENT AND TRADEMARK OFFICE
CERTIFICATE OF CORRECTION

PATENT NO. : 7,483,997 B2  Page 1 of 1
APPLICATION NO. : 10/169992
DATED : January 27, 2009
INVENTOR(S) : Riko Yagiu It is certified that error appears in the above-identified patent and that said Letters Patent is hereby corrected as shown below:

Title page 1, Column 1, Item (54) and Column 1, Line 1:

The title reading "DATA DISTRIBUTION CONTROL DEVICE AND DATA DISTRIBUTION CONTROL METHOD" should read --DATA DISTRIBUTION MANAGEMENT DEVICE AND DATA DISTRIBUTION MANAGEMENT METHOD--.

Signed and Sealed this

Thirteenth Day of July, 2010

David J. Kappos
*Director of the United States Patent and Trademark Office*